(12) United States Patent
Suzuki et al.

(10) Patent No.: US 8,855,850 B2
(45) Date of Patent: Oct. 7, 2014

(54) PARKING ASSISTANT AND PARKING ASSISTING METHOD

(75) Inventors: Masayasu Suzuki, Yokohama (JP);
Takeshi Akatsuka, Yokohama (JP);
Satoshi Kawai, Yokohama (JP);
Yoshinori Nakano, Yokosuka (JP);
Hidenori Seguchi, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 569 days.

(21) Appl. No.: 12/680,400

(22) PCT Filed: Sep. 22, 2008

(86) PCT No.: PCT/JP2008/002615
§ 371 (c)(1),
(2), (4) Date: Mar. 26, 2010

(87) PCT Pub. No.: WO2009/044513
PCT Pub. Date: Apr. 9, 2009

(65) Prior Publication Data
US 2010/0228426 A1    Sep. 9, 2010

(30) Foreign Application Priority Data

Oct. 1, 2007    (JP) .................................. 2007-257986

(51) Int. Cl.
*G06F 19/00*    (2011.01)
*B62D 15/02*    (2006.01)

(52) U.S. Cl.
CPC ................................ *B62D 15/0275* (2013.01);
*B62D 15/028* (2013.01)
USPC ........ 701/29; 701/1; 701/36; 701/41; 701/91; 701/216; 701/301; 715/517; 359/888; 340/932.2; 342/70

(58) Field of Classification Search
USPC ............ 701/1, 36, 41, 91, 216, 301; 715/517; 359/888; 340/932.2; 342/70
See application file for complete search history.

(56) References Cited

U.S. PATENT DOCUMENTS 2,955,507 A * 10/1960 Leitz .............................. 359/888
6,285,317 B1    9/2001 Ong
(Continued)

FOREIGN PATENT DOCUMENTS

EP    1 179 958    2/2002
EP    1 442 962 A2    8/2004
(Continued)

OTHER PUBLICATIONS

M. Suzuki et al., U.S. PTO Non-Final Office Action, U.S. Appl. No. 12/680,423, dated Mar. 28, 2012, 18 pgs.
(Continued)

*Primary Examiner* — James Trammell
*Assistant Examiner* — Sanjeev Malhotra
(74) *Attorney, Agent, or Firm* — Foley & Lardner LLP

(57) ABSTRACT

A parking assistant includes: shooting part shooting surroundings; parking target position setter setting parking target position in surroundings image by shooting part; rearward movement starting position calculator calculating rearward movement starting position based on: target position by position setter, and vehicle's movable area, rearward movement starting position denoting position stopping vehicle and starting rearward movement of vehicle, to park vehicle in target position; movement calculator sensing movement direction and movement amount of vehicle; and image generator superposing an information image on surroundings image based on movement direction and amount which are sensed with movement calculator. Information image denotes rearward movement starting position for allowing vehicle to be parked in target position. According to vehicle's movement, image generator generates, with different displays, following sub-positions of rearward movement starting position: first sub-position allowing vehicle to move to target position, and second sub-position failing to allow vehicle to be parked in target position.

10 Claims, 14 Drawing Sheets

(56) References Cited

U.S. PATENT DOCUMENTS

| | | | |
|---|---|---|---|
| 7,012,550 B2 | 3/2006 | Iwakiri et al. | |
| 7,257,486 B2 | 8/2007 | Shimazaki et al. | |
| 7,317,813 B2 | 1/2008 | Yanagawa et al. | |
| 7,592,928 B2 | 9/2009 | Chinomi et al. | |
| 7,640,107 B2 | 12/2009 | Shimizu et al. | |
| 7,734,417 B2* | 6/2010 | Chinomi et al. | 701/301 |
| 7,825,828 B2 | 11/2010 | Watanabe et al. | |
| 2003/0004613 A1* | 1/2003 | Hahn et al. | 701/1 |
| 2003/0122687 A1* | 7/2003 | Trajkovic et al. | 340/932.2 |
| 2004/0003351 A1* | 1/2004 | Sommerer et al. | 715/517 |
| 2004/0049341 A1 | 3/2004 | Fujiwara | |
| 2004/0153243 A1 | 8/2004 | Shimazaki et al. | |
| 2004/0249564 A1 | 12/2004 | Iwakiri et al. | |
| 2005/0049767 A1* | 3/2005 | Endo et al. | 701/36 |
| 2005/0143893 A1* | 6/2005 | Takamatsu et al. | 701/91 |
| 2005/0285758 A1 | 12/2005 | Matsukawa et al. | |
| 2006/0080005 A1 | 4/2006 | Lee et al. | |
| 2006/0119472 A1 | 6/2006 | Tsuboi | |
| 2006/0235590 A1 | 10/2006 | Bolourchi et al. | |
| 2006/0274147 A1 | 12/2006 | Chinomi et al. | |
| 2006/0287825 A1* | 12/2006 | Shimizu et al. | 701/216 |
| 2006/0287826 A1 | 12/2006 | Shimizu et al. | |
| 2007/0075875 A1* | 4/2007 | Danz et al. | 340/932.2 |
| 2007/0129863 A1* | 6/2007 | Hsu et al. | 701/36 |
| 2007/0273554 A1* | 11/2007 | Sakakibara | 340/932.2 |
| 2008/0077294 A1* | 3/2008 | Danz et al. | 701/41 |
| 2008/0169965 A1* | 7/2008 | Minichshofer | 342/70 |
| 2008/0266137 A1* | 10/2008 | Son | 340/932.2 |
| 2009/0091475 A1* | 4/2009 | Watanabe et al. | 340/932.2 |
| 2009/0121899 A1 | 5/2009 | Kakinami et al. | |

FOREIGN PATENT DOCUMENTS

| | | |
|---|---|---|
| EP | 1 462 342 A2 | 9/2004 |
| EP | 1 642 768 A1 | 4/2006 |
| EP | 1 683 707 A1 | 7/2006 |
| EP | 1 908 641 A1 | 4/2008 |
| EP | 1 950 097 A1 | 7/2008 |
| GB | 2 357 743 A | 7/2001 |
| GB | 2 409 921 A | 7/2005 |
| JP | 11-208420 A | 8/1999 |
| JP | 2001-010427 A | 1/2001 |
| JP | 2003-104149 A | 4/2003 |
| JP | 2003-115100 A | 4/2003 |
| JP | 2004-235986 A | 8/2004 |
| JP | 2004-306814 A | 11/2004 |
| JP | 2005-239048 A | 9/2005 |
| JP | 2006-129021 A | 5/2006 |
| JP | 2006-290051 A | 10/2006 |
| JP | 2006-341641 A | 12/2006 |
| JP | 2007-088577 A | 4/2007 |
| JP | 2007-168560 A | 7/2007 |
| JP | 2007-183877 A | 7/2007 |
| JP | 2007-230371 A | 9/2007 |
| WO | WO 2007/058246 A1 | 5/2007 |

OTHER PUBLICATIONS

U.S. Appl. No. 12/680,423, filed Mar. 26, 2010, Masayasu Suzuki et al.

English translation of JP 11-208420 A, Aug. 3, 19, 22 pages.

English translation of JP 2003-104149 A, Apr. 9, 2003, 20 pages.

M.Suzuki et al., U.S. PTO Final Office Action, U.S. Appl. No. 12/680,423, dated Aug. 28, 2012, 18 pgs.

M. Suzuki et al., Non-final Office Action, U.S. Appl. No. 12/680,423, dated Mar. 27, 2013, (18 pgs.).

M. Suzuki et al., USPTO Non-Final Office Action U.S. Appl. No. 12/680,423, dated Mar. 25, 2014, (17 pgs.).

M. Suzuki et al., USPTO Final Office Action U.S. Appl. No. 12/680,423, dated Oct. 10, 2013, (15 pgs.).

* cited by examiner

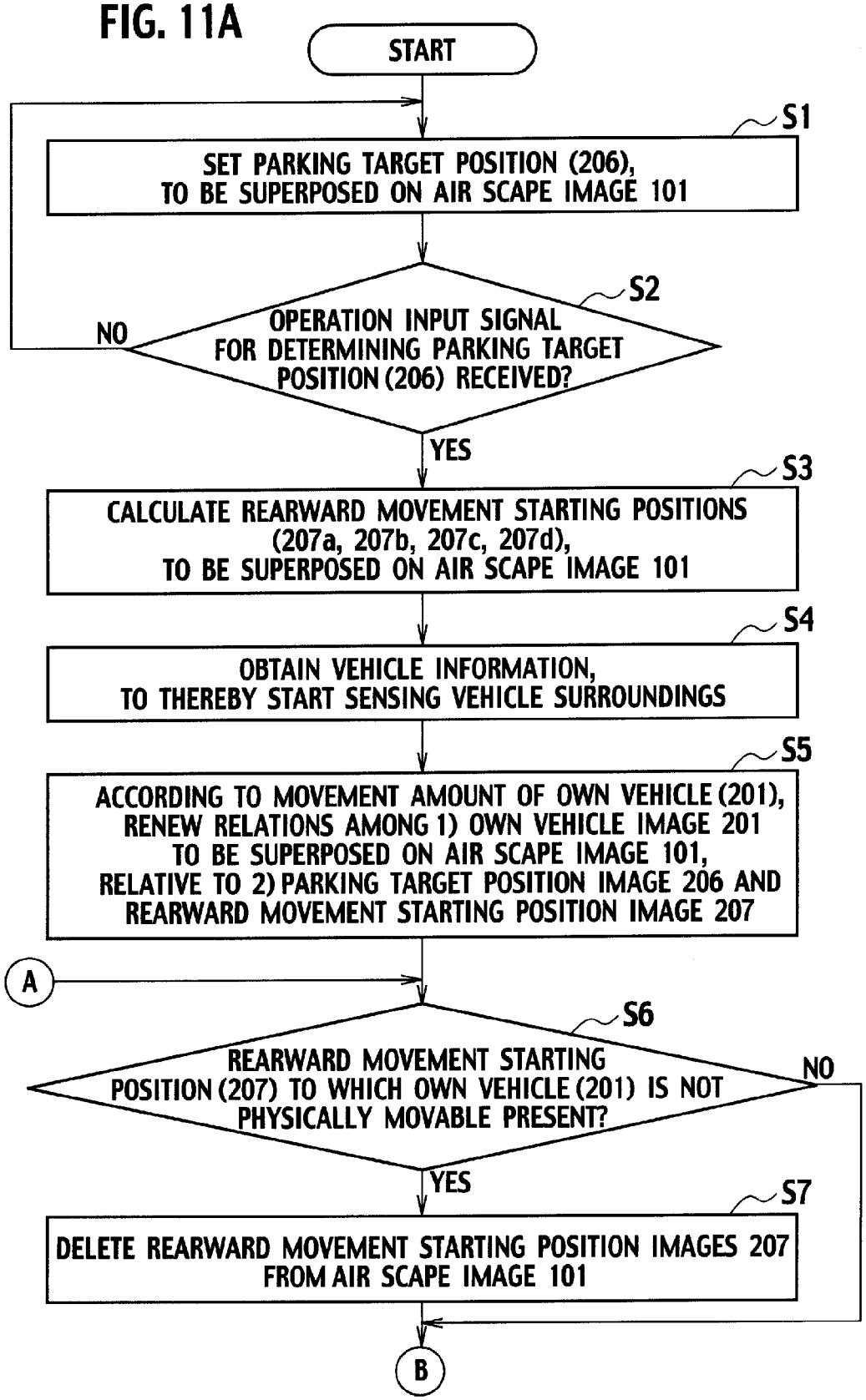

PARKING ASSISTANT AND PARKING ASSISTING METHOD

TECHNICAL FIELD

The present invention relates to a parking assistant and a parking assisting method which assist a driver to park the driver's own vehicle, where the assisting is done by providing the driver with an image which displays vehicle surroundings.

BACKGROUND ART

Japanese Patent Application Laid-Open No. 2003-104149 (=JP2003104149) discloses a conventional parking assistant (parking support device) using an air scape image showing a vehicle viewed from the sky which is an imaginary viewpoint, where the air scape image is taken by shooting the vehicle surroundings with a plurality of cameras and making a coordinates conversion of the thus obtained image. The above parking assistant senses parking target position information as a parking space, calculates rearward movement starting position information as a position passed by a vehicle for moving the vehicle to the parking target position, calculates estimated track lines of the vehicle and superposes the results on the air scape image, to thereby provide the driver with the above information. The above operations assist the driver to park the vehicle.

DISCLOSURE OF INVENTION

Technical Problem

The parking assistant of JP2003104149, however, provides only one rearward movement starting position. As such, the above parking assistant is unable to assist the driver to park the vehicle when, for example, an obstacle is present near the rearward movement starting position provided.

In view of the above, it is an object of the present invention to provide a parking assistant and a parking assisting method which are capable of assisting the driver to park the vehicle according to vehicle surroundings.

Technical Solution

According to a first aspect of the present invention, a parking assistant comprises: a shooting part for shooting vehicle surroundings; a parking target position setter for setting a parking target position in a vehicle surroundings image shot by the shooting part; a rearward movement starting position calculator for calculating a rearward movement starting position based on: the parking target position set by the parking target position setter, and a movable area of a vehicle, the rearward movement starting position denoting a position for stopping the vehicle and thereby starting a rearward movement of the vehicle, so as to park the vehicle in the parking target position; a movement calculator for sensing a movement direction of the vehicle and a movement amount of the vehicle; and an image generator for superposing an information image on the vehicle surroundings image based on the movement direction and the movement amount which are sensed with the movement calculator, wherein the information image denotes the rearward movement starting position for allowing the vehicle to be parked in the parking target position, and according to a movement of the vehicle, the image generator generates, with different displays, the following sub-positions of the rearward movement starting position: a first sub-position which allows the vehicle to move to the parking target position, and a second sub-position which fails to allow the vehicle to be parked in the parking target position.

According to a second aspect of the present invention, a parking assistant comprises: a shooting part for shooting vehicle surroundings; a parking target position setter for setting a parking target position in a vehicle surroundings image shot by the shooting part; a rearward movement starting position calculator for calculating a rearward movement starting position based on: the parking target position set by the parking target position setter, and a movable area of a vehicle, the rearward movement starting position denoting a position for stopping the vehicle and thereby starting a rearward movement of the vehicle, so as to park the vehicle in the parking target position; a movement calculator for sensing a movement direction of the vehicle and a movement amount of the vehicle; and an image generator for superposing an information image on the vehicle surroundings image based on the movement direction and the movement amount which are sensed with the movement calculator, wherein the information image denotes a plurality of the rearward movement starting positions for allowing the vehicle to be parked in the parking target position, and according to a movement of the vehicle, the rearward movement starting positions are decreased.

According to a third aspect of the present invention, a parking assistant comprises: a shooting part for shooting vehicle surroundings; a parking target position setter for setting a parking target position in a vehicle surroundings image shot by the shooting part; a rearward movement starting position calculator for calculating a rearward movement starting position based on: the parking target position set by the parking target position setter, and a movable area of a vehicle, the rearward movement starting position denoting a position for stopping the vehicle and thereby starting a rearward movement of the vehicle, so as to park the vehicle in the parking target position; a movement calculator for sensing a movement direction of the vehicle and a movement amount of the vehicle; and an image generator for superposing an information image on the vehicle surroundings image based on the movement direction and the movement amount which are sensed with the movement calculator, wherein the information image denotes a certain rearward movement starting position which is selected from the rearward movement starting positions calculated with the rearward movement starting position calculator and to which the vehicle is movable.

According to a fourth aspect of the present invention, a parking assistant comprises: a shooting means for shooting vehicle surroundings; a parking target position setting means for setting a parking target position in a vehicle surroundings image shot by the shooting means; a rearward movement starting position calculating means for calculating a rearward movement starting position based on: the parking target position set by the parking target position setting means, and a movable area of a vehicle, the rearward movement starting position denoting a position for stopping the vehicle and thereby starting a rearward movement of the vehicle, so as to park the vehicle in the parking target position; a movement calculating means for sensing a movement direction of the vehicle and a movement amount of the vehicle; and an image generating means for superposing an information image on the vehicle surroundings image based on the movement direction and the movement amount which are sensed with the movement calculating means, wherein the information image denotes the rearward movement starting position for allowing the vehicle to be parked in the parking target position, and according to a movement of the vehicle, the image generating means generates, with different displays, the following sub-positions of the rearward movement starting position: a first sub-position which allows the vehicle to move to the parking target position, and a second sub-position which fails to allow the vehicle to be parked in the parking target position.

According to a fifth aspect of the present invention, 1 parking assisting method comprises: shooting vehicle surroundings; setting a parking target position in a vehicle surroundings image shot by the shooting; calculating a rearward movement starting position based on: the parking target position set by the setting, and a movable area of a vehicle, the rearward movement starting position denoting a position for stopping the vehicle and thereby starting a rearward movement of the vehicle, so as to park the vehicle in the parking target position; sensing a movement direction of the vehicle and a movement amount of the vehicle; and superposing an information image on the vehicle surroundings image based on the movement direction and the movement amount which are sensed by the sensing, wherein the information image denotes the rearward movement starting position for allowing the vehicle to be parked in the parking target position, and according to a movement of the vehicle, the superposing generates, with different displays, the following sub-positions of the rearward movement starting position: a first sub-position which allows the vehicle to move to the parking target position, and a second sub-position which fails to allow the vehicle to be parked in the parking target position.

BRIEF DESCRIPTION OF THE DRAWINGS

FIG. 11A is a first part of a flowchart showing specific processes for providing the driver with the air scape image on which the parking target position image and the rearward movement starting position image are superposed, in connection with the parking assistant of the present invention.

BEST MODE FOR CARRYING OUT THE INVENTION

In the following, various embodiments of the present invention will be described in detail with reference to the accompanying drawings.

For ease of understanding, the following description will contain various directional terms, such as left, right, upper, lower, front, rearward and the like. However, such terms are to be understood with respect to only a drawing or drawings on which the corresponding part of element is illustrated.

In addition, it is noted that the drawings referred to hereinafter as illustrating the embodiments of the present invention are not to scale and are schematic in nature and, therefore, should not be taken too literally. Nevertheless, the drawings illustrate the invention sufficiently to enable one skilled in the art to practice the invention.

(First Embodiment)
<Structure>

Figure 1:
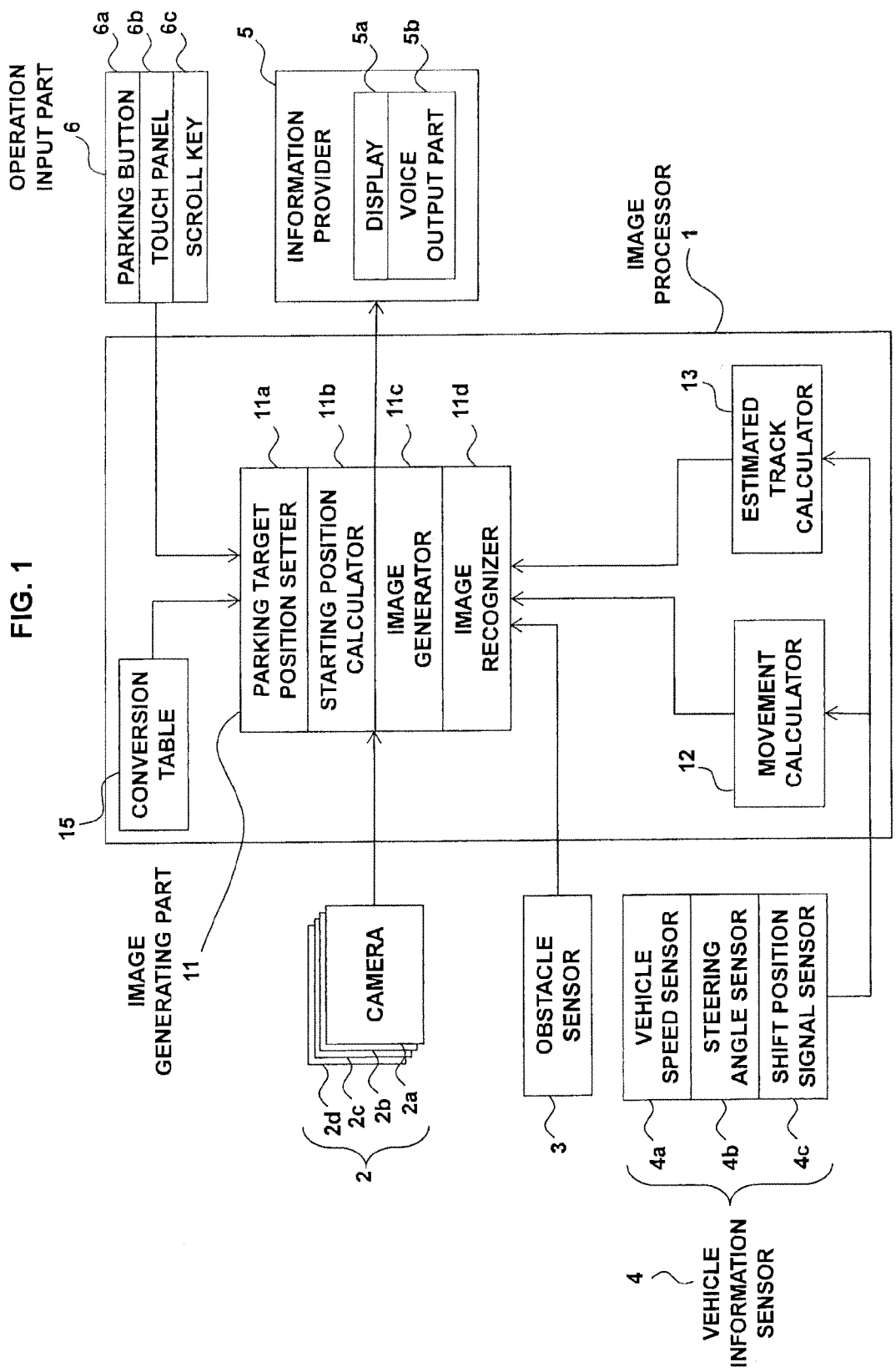
FIG. 1 is a block diagram showing a structure of a parking assistant under the present invention.

The president invention is applicable, for example, to a parking assistant 10 having a structure shown in FIG. 1, according to a first embodiment. The parking assistant 10 is capable of providing a driver of a vehicle with the following pieces of information: 1) vehicle surroundings conditions, 2) a parking target position calculated based on the vehicle surrounding conditions, and 3) a rearward movement starting position denoting a position for starting a rearward movement by stopping the vehicle so as to park the vehicle in the parking target position.

The parking assistant 10 includes: a vehicle surroundings image processor 1 (otherwise referred to as "controller 1"), shooting parts 2a, 2b, 2c, 2d such as camera or video camera (hereinafter typically referred to as "cameras 2a, 2b, 2c, 2d" or "camera 2" for denoting generic) for shooting vehicle surroundings images, an obstacle sensor 3 such as ultrasonic sensor for sensing an obstacle surrounding the vehicle, a vehicle information sensor 4 (including a vehicle speed sensor 4a, a steering angle sensor 4b and a shift position signal sensor 4c) for receiving various pieces of information on the vehicle, an information provider 5 having a display 5a and a voice output part 5b (speaker), and an operation input part 6 (including a parking button 6a, a touch panel 6b and a scroll key 6c which are to be set forth afterward referring to FIG. 2G) operated by the driver. The parking assistant 10 is installed, for example, in such a manner that the controller 1 is set in an instrument panel, the cameras 2a, 2b, 2c, 2d are disposed in positions capable of shooting respectively front, rear, left and right sides of the vehicle, and the obstacle sensor 3 is set in a front or rear position of the vehicle, and each of the information provider 5 and the operation input part 6 is set in a position viewable by the driver.

The camera 2 includes, for example, a CCD (Charge Coupled Device) camera or a CMOS (Complementary Metal-Oxide Semiconductor) camera. The camera 2 transmits vehicle surroundings image data to an image generating part 11 (image generator 11c) of the controller 1. According to the first embodiment, the four cameras 2a, 2b, 2c, 2d for respectively shooting front, rear, left and right sides of the vehicle allow the vehicle surroundings image data of front, rear, left and right sides of the vehicle to be transmitted to the image generating part 11 of the controller 1. The cameras 2 may be smaller than four as long as being capable of setting the parking target position and rearward movement starting position which are to be described afterward.

The obstacle sensor 3 includes an ultrasonic sensor which is set, for example, at front left, front right, rear left and rear right ends of the vehicle. Sensing a distance from the vehicle to the obstacle around the vehicle, the obstacle sensor 3 outputs obstacle position information to the image generating part 11 of the controller 1. Based on a time from transmission of the ultrasonic wave to reception of the ultrasonic wave, the obstacle sensor 3 senses the distance to the obstacle. Meanwhile, based on the ultrasonic sensor's mounting direction relative to the vehicle, the obstacle sensor 3 senses the direction of the thus sensed obstacle.

The vehicle information sensor 4 senses a behavior of the driver's own vehicle (hereinafter simply referred to as "own vehicle"), and includes, for example, the vehicle speed sensor 4a, steering angle sensor 4b and shift position signal sensor 4c. The vehicle speed sensor 4a senses a speed of the own vehicle. The steering angle sensor 4b senses a steering angle of the own vehicle. The shift position signal sensor 4c senses a shift position (gear position) of the own vehicle. The vehicle information sensor 4 outputs the vehicle speed signal, steering angle signal and shift position signal to a movement calculator 12 and an estimated track calculator 13 of the controller 1.

For providing the driver with various pieces of information for assisting the driver's operation, the information provider 5 includes the display 5a for displaying the vehicle surroundings images and the speaker 5b for outputting a guidance voice. The display 5a mainly displays an image which is a combination of the following superposed images: 1) information images such as the parking target position, rearward movement starting position and the like, superposed on 2) vehicle surroundings image. Hereinafter, the above superposed image is referred to as "display image." In addition, the speaker 5b outputs the guidance voice for directing the rearward movement starting position and parking target position and the like to the driver.

The operation input part 6 includes the parking button 6a, touch panel 6b, scroll key 6c or the like operated by the driver. An operation input signal sensed by the operation input part 6 and denoting the driver's operation is supplied to the controller 1.

The controller 1 includes: 1) the image generating part 11 connected with the cameras 2a, 2b, 2c, 2d, obstacle sensor 3, information provider 5 and operation input part 6, 2) the movement calculator 12 connected with the vehicle information sensor 4, and 3) the estimated track calculator 13 connected with the vehicle information sensor 4. Though the controller 1 includes a hardware which is a computer including CPU, ROM, RAM and the like, description in FIG. 1 is made by dividing respective functional blocks for convenience' sake.

Making a calculation based on the vehicle speed signal from the vehicle speed sensor 4a, the steering angle signal from the steering angle sensor 4b and the shift position signal from the shift position signal sensor 4c, the movement calculator 12 senses movement amount of the own vehicle. Then, based on a tire turning angle information converted from the shift position signal and steering angle signal, the movement calculator 12 calculates a movement direction of the vehicle. Meanwhile, from the vehicle speed signal, the movement calculator 12 calculates the vehicle's movement amount in the movement direction. The movement amount information calculated with the movement calculator 12 is outputted to the image generating part 11.

From the tire turning angle information converted based on the shift position signal and steering angle signal which are outputted from the vehicle information sensor 4, the estimated track calculator 13 calculates an estimated track of the own vehicle. The estimated track information of the own vehicle is outputted to the image generating part 11.

By using the obstacle position information outputted from the obstacle sensor 3, the movement amount information from the movement calculator 12 and the estimated track information outputted from the estimated track calculator 13, the image generating part 11 generates the display image which is developed by superposing various information images on the vehicle surroundings image shot by the camera 2. The image generating part 11 makes a coordinates conversion of each of the four vehicle surroundings image data, that is, front, rear, left and right images of the vehicle, which images are shot by the cameras 2a, 2b, 2c, 2d respectively. Then, the image generating part 11 synthesizes the four data, to thereby generate an air scape image viewed from the sky which is an imaginary view point. Then, the image generating part 11 superposes the information images (such as the rearward movement starting position, the parking target position and the like) on the air scape image. Hereinafter, the description will be made with the air scape image used as the vehicle surroundings image. However, as long as the information images (such as the rearward movement starting position, the parking target position and the like) can be provided for the driver, the vehicle surroundings image shot by each of the cameras 2a, 2b, 2c, 2d may be used as it is.

Figure 2A:
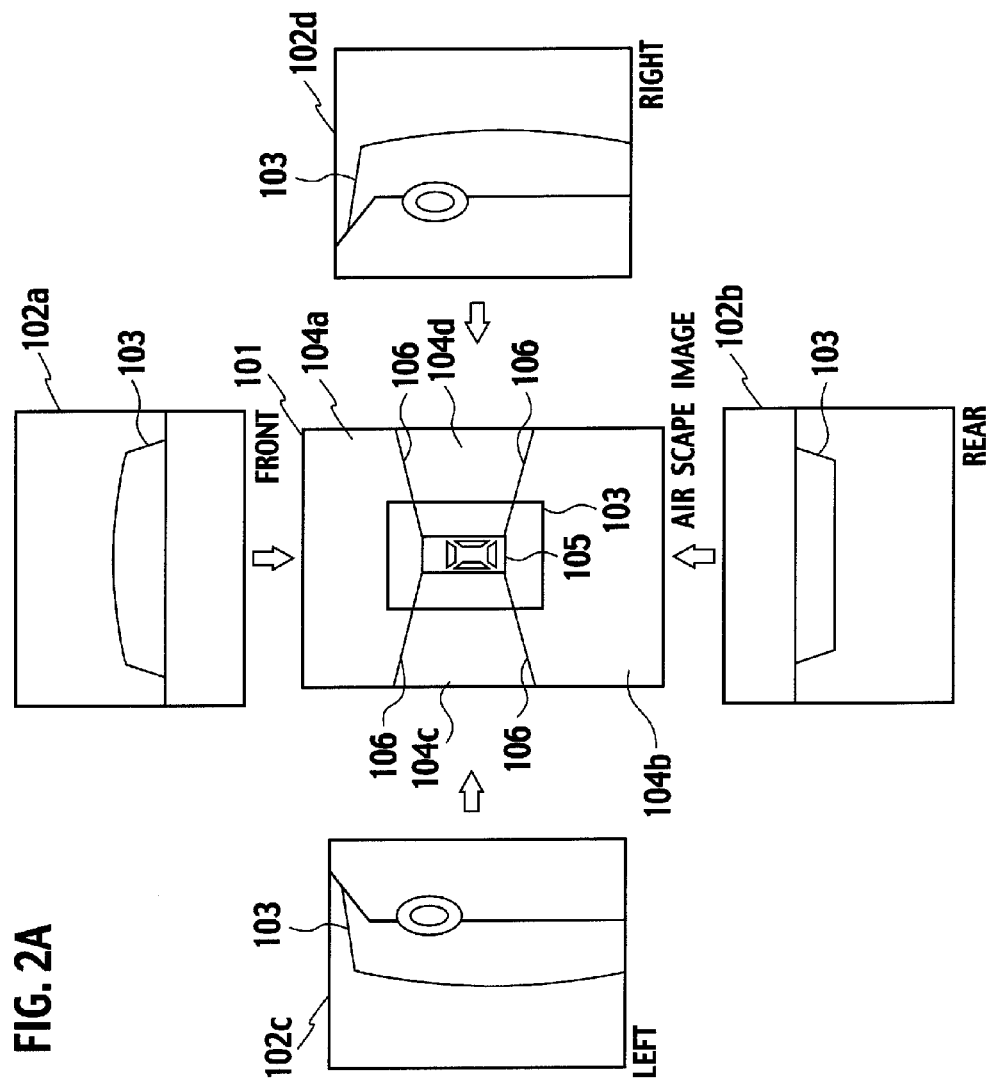
FIG. 2A shows processes for making a single air scape image from a vehicle surroundings image shot by a plurality of shooting parts, in connection with the parking assistant of the present invention.

As shown in FIG. 2A, the coordinates conversion for generating an air scape image 101 with the image generating part 11 uses: a vehicle surroundings image 102a of the vehicle's front side shot by the camera 2a, a vehicle surroundings image 102b of the vehicle's rear side shot by the camera 2b, a vehicle surroundings image 102c of the vehicle's left side shot by the camera 2c, and a vehicle surroundings image 102d of the vehicle's right side shot by the camera 2d. The vehicle surroundings images 102a, 102b, 102c, 102d each include a line 103 drawn on the ground in the vehicle position. In addition, the line 103 is a guideline for generating the air scape image 101 by using the vehicle surroundings images 102a, 102b, 102c, 102d.

The image generating part 11 makes the coordinates conversion of each of the vehicle surroundings images 102a, 102b, 102c, 102d. Specifically, the image generating part 11 makes the following operations: 1) coordinates-converting the vehicle surroundings image 102a of the vehicle's front side, to thereby generate a partial image 104a denoting the vehicle's front side viewed from the sky, 2) coordinates-converting the vehicle surroundings image 102b of the vehicle's rear side, to thereby generate a partial image 104b denoting the vehicle's rear side viewed from the sky, 3) coordinates-converting the vehicle surroundings image 102c of the vehicle's left side, to thereby generate a partial image 104c denoting the vehicle's left side viewed from the sky, and 4) coordinates-converting the vehicle surroundings image 102d of the vehicle's right side, to thereby generate a partial image 104d denoting the vehicle's right side viewed from the sky. Then, the image generating part 11 synthesizes the thus coordinates-converted partial images 104a, 104b, 104c, 104d, to thereby generate the air scape image 101 denoting the vehicle surroundings viewed from the sky. Hereinabove, in a center part of the air scape image 101, the image generating part 11 disposes an own vehicle mark 105 denoting the own vehicle. The own vehicle mark 105 is otherwise referred to as an own vehicle image 105.

Figure 2B:
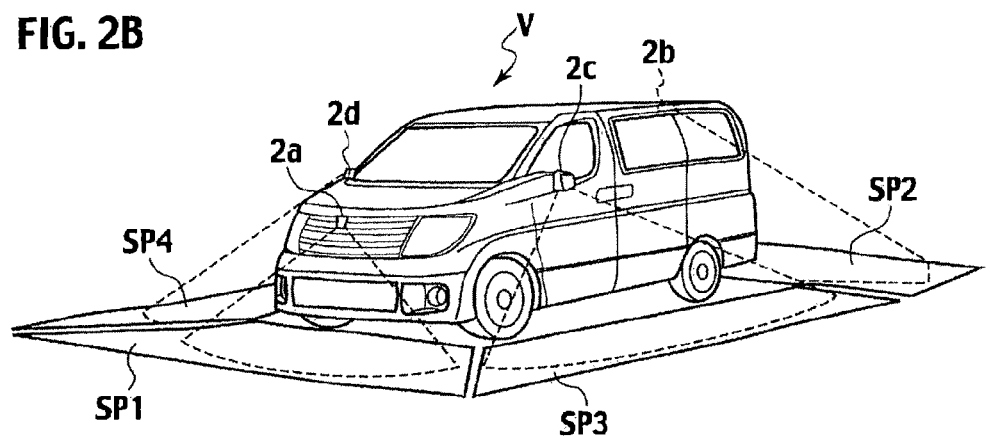
FIG. 2B sets forth a part of details of coordinates-converting under the present invention.

The coordinates-converting is to be set forth more in detail, referring to FIG. 2B to FIG. 2F. The cameras 2a, 2b, 2c, 2d are installed in the front, rear, left and right sides of the vehicle V to photograph images of four directions around the vehicle V. For example, as shown in FIG. 2B, the camera 2a is installed in a predetermined position of the front side of the vehicle V such as a position near a front grille to photograph an image (front view image hereinafter) of a predetermined photographing area SP1 of the front side of the vehicle V. The camera 2b is installed in a predetermined area of the rear side of the vehicle V such as a roof spoiler to photograph an image (rear view image) of a predetermined photographing area SP2 of the rear side of the vehicle V. The camera 2c is installed in a predetermined position of the left side of the vehicle V such as a left side minor to photograph an image (left side view image) of a predetermined photographing area SP3 of the left side of the vehicle V. The camera 2d is installed in a predetermined position of the right side of the vehicle V such as a right side mirror to photograph an image (right side view image) of a predetermined photographing area SP4 of the right side of the vehicle V. Data of the images photographed by the four cameras 2a, 2b, 2c, 2d are fed to the controller 1 as needed.

The image generating part 11 forms a composite image (top view image hereinafter) looking down at all the surroundings of the vehicle V from a virtual viewpoint above the vehicle V.

The image generating part 11 viewpoint-changes the front view image, the left side view image, the rear view image, and the right side view image photographed by the cameras 2a, 2b, 2c, 2d into overview images by using a conversion table 15 describing a correspondence of image addresses between images before and after conversion, and joins these images to form a top view image similar to that shown in FIG. 2A. The viewpoint changing process of the image generating part 11 means a process of converting an image similar to that shown in FIG. 2E which is obtained by, for example, photographing a predetermined photographing area SP with an installing position of a real camera 21 of FIG. 2D set as a viewpoint into an overview image (image looking down at a photographing area directly above the vehicle V's center) similar to that shown in FIG. 2F when a predetermined photographing area SP is photographed by using a virtual camera 22 of FIG. 2D as a viewpoint. Though being disclosed only on the rear side of the vehicle V in FIG. 2D, the real camera 21 is also disposed on the front, right and left sides of the vehicle V. A relation between the images before and after conversion is uniquely decided based on lens characteristics of the camera and a mounting angle. Thus, the viewpoint changing process of the image generating part 11 can be realized only by coordinates conversion of an image memory using the conversion table 15. The image generating part 11 carries out the viewpoint changing process for the front view image, the left side view image, the rear view image, and the right side view image photographed by the cameras 2a, 2b, 2c, 2d, cuts out necessary parts of obtained overview images and joins the images to form a top view image similar to that shown in FIG. 2A.

Figure 2C:
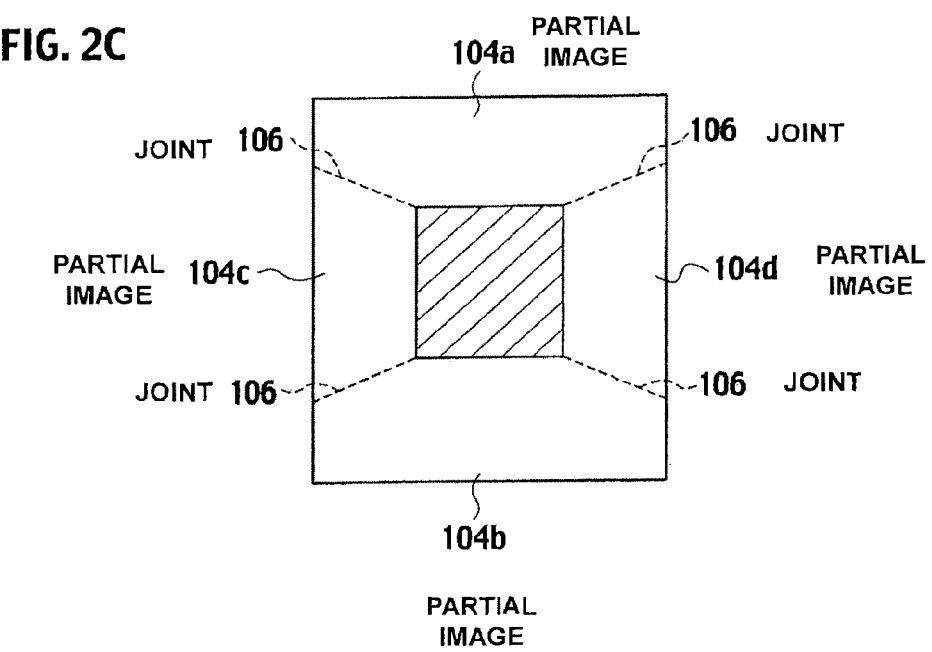
FIG. 2C sets forth a part of details of coordinates-converting under the present invention.
Figure 2D:
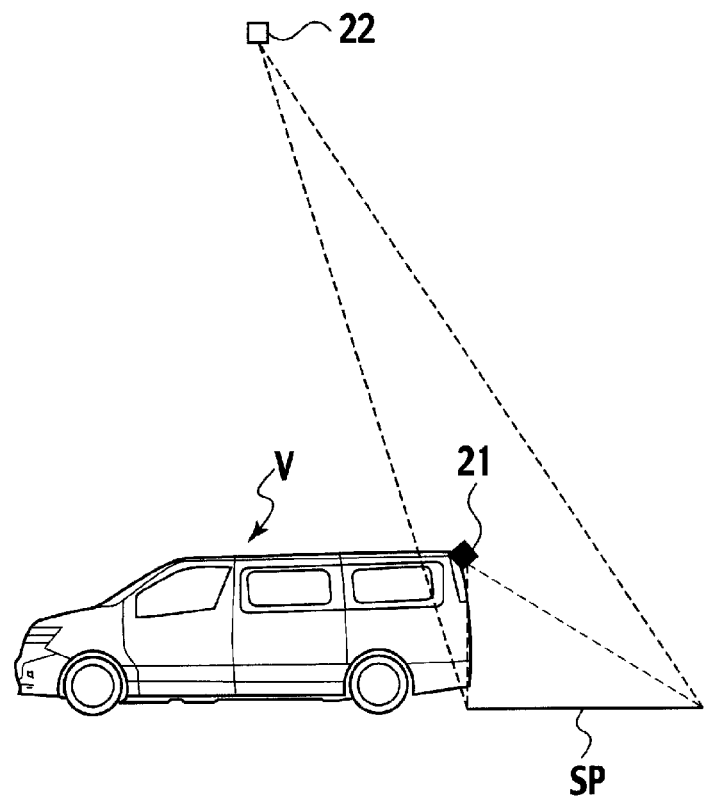
FIG. 2D sets forth a part of details of coordinates-converting under the present invention.
Figure 2E:
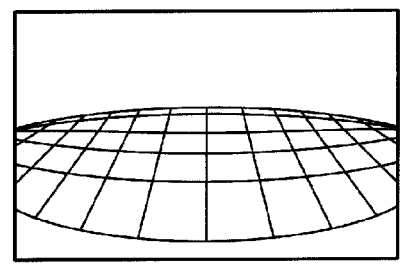
FIG. 2E sets forth a part of details of coordinates-converting under the present invention.
Figure 2F:
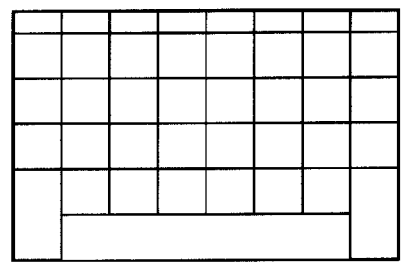
FIG. 2F sets forth a part of details of coordinates-converting under the present invention.

In an image example of FIG. 2C, the partial image 104a is a cutout of a part of the overview image obtained by subjecting the front view image photographed by the on-vehicle camera 2a to viewpoint changing, the partial image 104b is a cutout of a part of the overview image obtained by subjecting the rear view image photographed by the on-vehicle camera 2b to viewpoint changing, the partial image 104c is a cutout of a part of the overview image obtained by subjecting the left side view image photographed by the on-vehicle camera 2c to viewpoint changing, and the partial image 104d is a cutout of a part of the overview image obtained by subjecting the right side view image photographed by the on-vehicle camera 2d to viewpoint changing. In the image example of FIG. 2C, a shaded area of the image center indicates a position of the vehicle V. In FIG. 2C, the partial images 104a, 104b, 104c, 104d adjacent to each other are respectively connected by joints 106.

Figure 2G:
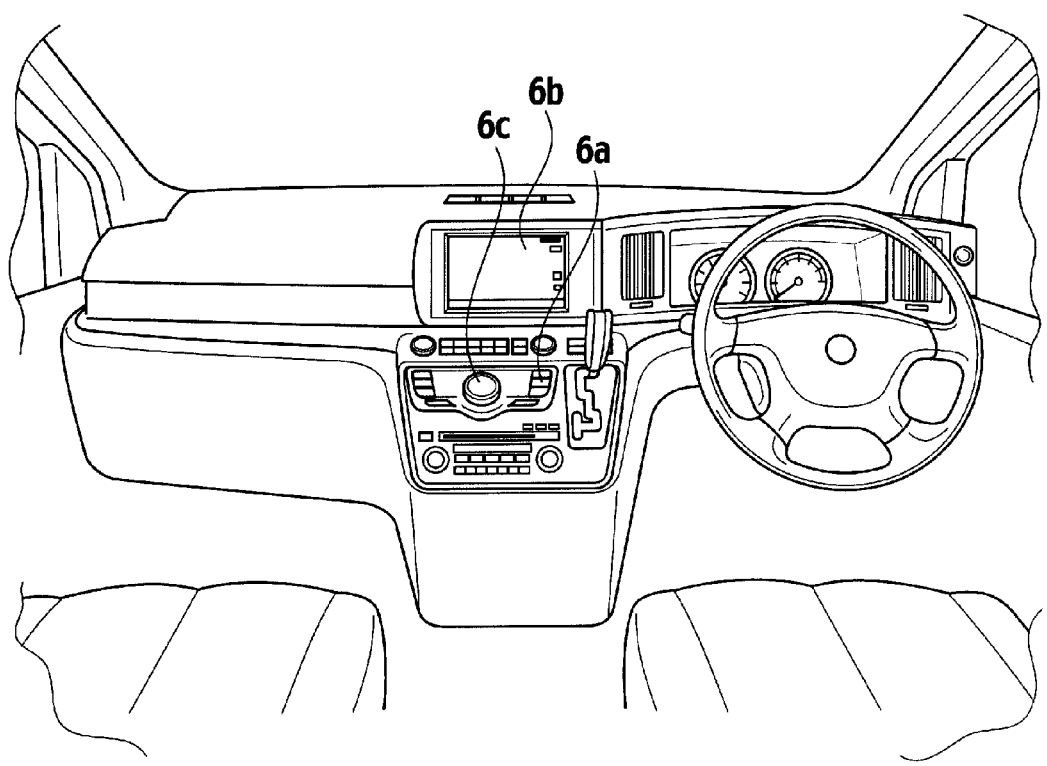
FIG. 2G shows interior of a vehicle including the parking button, touch panel and scroll key of an operation input part under the present invention.

FIG. 2G shows the interior of the vehicle V including the parking button 6a, touch panel 6b and scroll key 6c of the operation input part 6.

As such, the image generating part 11 makes the coordinates conversion of the vehicle surroundings image shot by the camera 2, to thereby generate the air scape image 101. Then, the image generating part 11 generates the display image by superposing the various information images on the air scape image 101.

(Operation)

Then, operations of the parking assistance by means of the parking assistant 10 having the above structure are to be set forth, referring to a display image 200 which is displayed on the display 5a and shown in FIG. 3 to FIG. 10.

Figure 3:
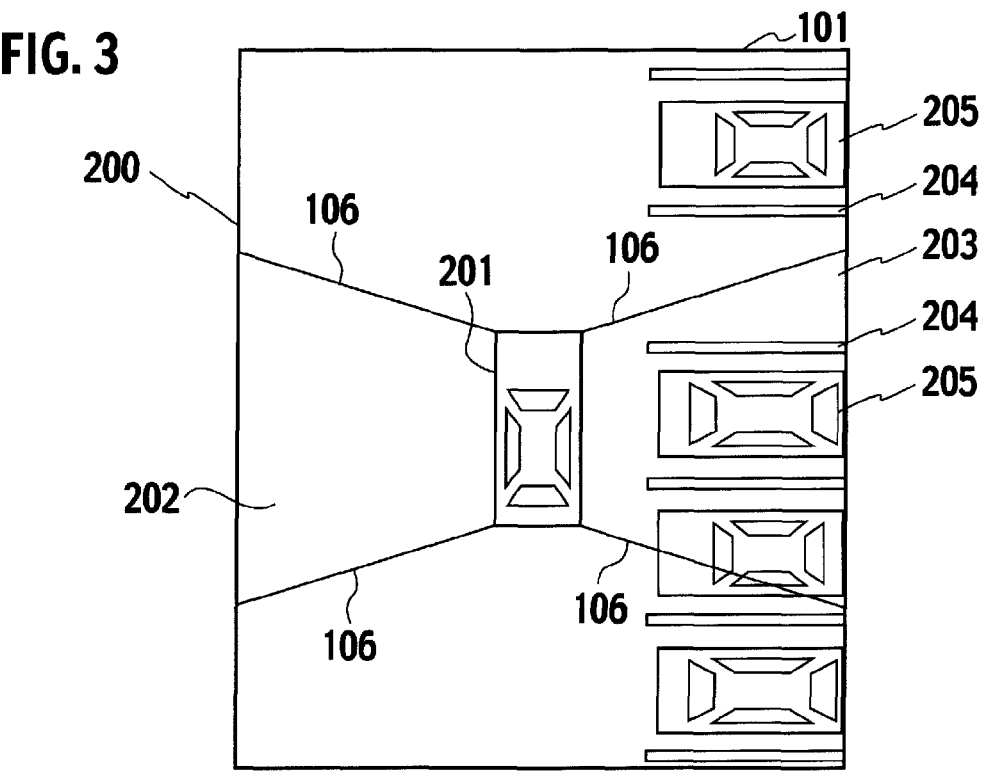
FIG. 3 shows the air scape image where an own vehicle travels in a pre-parking area, according to a first embodiment of the present invention.

As shown in FIG. 3, for parking the own vehicle (201) in a parking area 203, the driver slowly drives the own vehicle (201) in front of the parking area 203. Then, according to the driver's pressing of a parking button 6a (not shown in FIG. 3, see FIG. 2G) of the operation input part 6, the parking assistant 10 starts the parking assisting operation to display the display image 200 on the display 5a. Recognizing the thus pressed parking button 6a, the parking assistant 10 allows the image generating part 11 to generate the air scape image 101 by using the vehicle surroundings image data shot by the cameras 2a, 2b, 2c, 2d, to thereby display the display image 200 on the display 5a. In addition, the parking assistant 10 may display such a language as "Parking assistance started" on the display 5a or notify the same language with a voice from the speaker 5b. At this point in time, the display image 200 includes the own vehicle image 201, a pre-parking area 202, the parking area 203, white lines 204 and other vehicles 205.

Then, the parking assistant 10 sets the parking target position. Thereby, on the parking area 203, the parking assistant 10 superposes the parking target position image 206 as the information image (see FIG. 4). The thus processed air scape image 101 is displayed as the display image 200. In this case, the image generating part 11 may set the parking target position by any of the followings: 1) according to the driver's operation, 2) based on the obstacle position information outputted from the obstacle sensor 3, and 3) recognizing, from the image shot by the camera 2, the white line 204.

In a state that the air scape image 101 including the parking target position image 206 to which the own vehicle is movable is displayed on the display 5a, the parking target position is set based on the driver's operation. Specifically, the following operations encourage the driver to operate the operation input part 6: 1) allowing the display 5a to display such a language as "Move or turn the pink frame (the parking target position image 206) to the parking target position," or 2) notifying the driver of the same language with the speaker 5b. Then, from the operation input part 6, the image generating part 11 receives an operation input signal for moving the parking target position image 206 displayed on the display 5a. Then, in the display image 200, the image generating part 11 changes the display position of the parking target position image 206. According to the receiving of the operation input signal for setting the position of the parking target position image 206, the image generating part 11 determines the parking target position. For determining the position in the display image 200 displayed in the display 5a, the operation input part 6 is preferably the touch panel 6b, scroll key 6c or the like.

For setting of the parking target position based on the obstacle position information outputted from the obstacle sensor 3, the image generating part 11 determines, based on the obstacle position information, whether or not the parking area 203 having an inner length and a width which are sufficient for parking the own vehicle is present. When the parking area 203 for parking the own vehicle is present, the image generating part 11 sets the parking area 203's center position as the parking target position. For setting the parking target position based on the obstacle position information, preferably, the obstacle sensor 3 is at least two ultrasonic sensors disposed respectively at front left and front right ends of the vehicle. With this, the image generating part 11 determines the parking area 203 based on the obstacle position information obtained when the own vehicle passes in front of the parking area 203, to thereby set the parking target position.

The image generating part 11 as an image recognizer 11d sets the parking target position by recognizing the white line 204. Specifically, the image recognizer 11d takes the following operations: 1) generating the air scape image 101 by using the vehicle surroundings images 102a, 102b, 102c, 102d outputted from the cameras 2a, 2b, 2c, 2d, 2) implementing an edge sensing of the air scape image 101, and 3) sensing the while image 204. Then, comparing i) color information of the image area between the white lines 204 with ii) color information of the image close to the own vehicle, the image generating part 11 senses the parking area 203. For example, the image area having the other vehicle 205 between the white lines 204 becomes the color information different from the color information of the image close to the own vehicle. Meanwhile, the image area having the parking area 203 between the white lines 204 becomes the color information same as the color information of the image close to the own vehicle. Otherwise, the image generating part 11 may implement the edge sensing of the image data between the sensed white lines 204. After the edge sensing, the image area including the other vehicle 205 between the white lines 204 has many edges sensed, while the image area including the parking area 203 between the white lines 204 has a small amount of edges.

The image generating part 11 displays, as the parking target position image 206, the parking target position closest to the own vehicle, when a plurality of parking areas 203 are sensed by setting of the parking target position by any one of the followings: i) the obstacle position information, and ii) recognizing of the white line 204. In addition, when a plurality of parking areas 203 are sensed, it is preferable to set, based on the followings, the parking target position in the parking area 203 capable of parking the own vehicle: i) the parking area 203's position relative to the own vehicle's position, and ii) the own vehicle's movable area memorized in advance.

The image generating part 11 serves as a parking target position setter 11a for setting the parking target position in the vehicle surroundings image shot by the camera 2.

As set forth above, on the display 5a, the image generating part 11 displays the display image 200 including the parking target position image 206. In this case, the parking assistant 10 allows the driver to determine whether to set, as the parking target position, the position corresponding to the parking target position image 206. For example, such a language as "Can this position be set as parking target position?" is displayed on the display 5a, or the speaker 5b is used for notifying the driver of the same language, to thereby promote the driver to operate the operation input part 6. Then, from the operation input part 6, the image generating part 11 receives the operation input signal for determining, as the parking target position, the position corresponding to the parking target position image 206 displayed on the display 5a, to thereby determine the parking target position.

Figure 5:
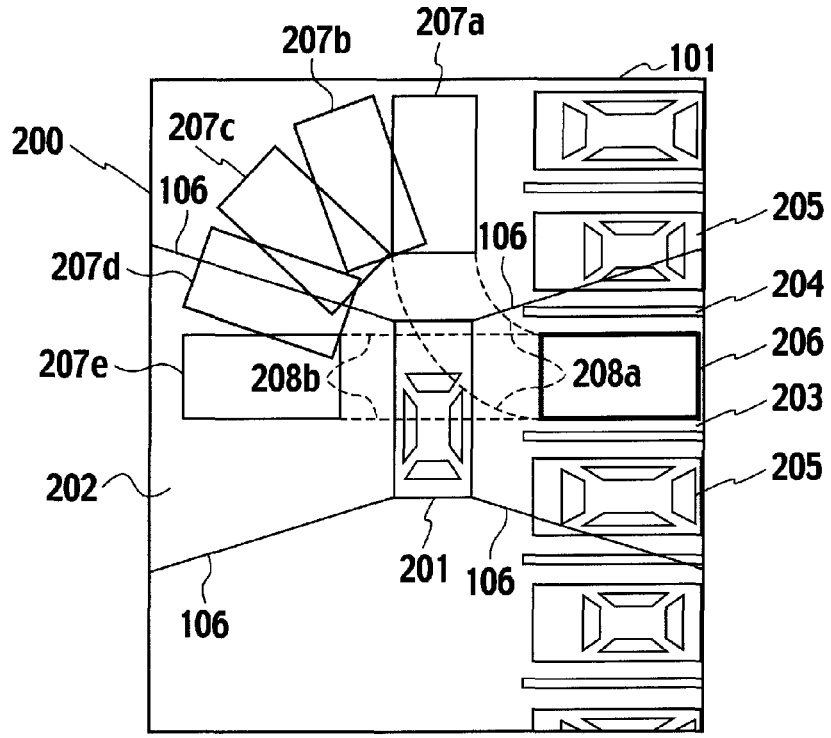
FIG. 5 shows the air scape image on which the parking target position image and a rearward movement starting position image are superposed, according to the first embodiment of the present invention.

Then, as shown in FIG. 5, the image generating part 11 displays a rearward movement starting position image 207 as information image denoting a position for stopping the vehicle and thereby moving rearward the vehicle so as to park the vehicle in the parking target position. The display image 200 in FIG. 5 displays a plurality of rearward movement starting position images 207a, 207b, 207c, 207d, 207e as positions for the vehicle to pass on the way before moving rearward. In addition, the rearward movement starting position images 207a, 207b, 207c, 207d, 207e each are same in scale as the own vehicle image 201. With the display image 200 displayed on the display 5a, the controller 1 displays, on the display 5a, such a language as "Move your vehicle to any one of the orange areas displayed (the rearward movement starting position image 207)" or notify the driver of the same language with the speaker 5b. As such, the display image 200 promotes the driver to superpose the own vehicle image 201 on the rearward movement starting position image 207.

The five rearward movement starting positions are set between the following positions: 1) a rearward movement starting position (207a) which is perpendicular to the parking target position (206) and allows the own vehicle (105) to move rearward as depicted by a track 208a, and 2) a rearward movement starting position (207e) which allows the own vehicle (105) to move rearward, with the tire in its neutral position, as displayed by a track 208b and to arrive at the parking target position 206. In the example in FIG. 5, three rearward movement starting positions (207b, 207c, 207d) corresponding to respective tire turning angles are set between the rearward movement starting position (207a) and the rearward movement starting position (207e), to thereby display the rearward movement starting position images 207b, 207c, 207d. As such, the image generating part 11 serves as a rearward movement starting position calculator 11b. Based on the parking target position and the vehicle's movable area, the rearward movement starting position calculator 11b calculates the position for starting the operations, that is, stopping the vehicle and thereby moving rearward the vehicle so as to park the vehicle in the parking target position.

Figure 6:
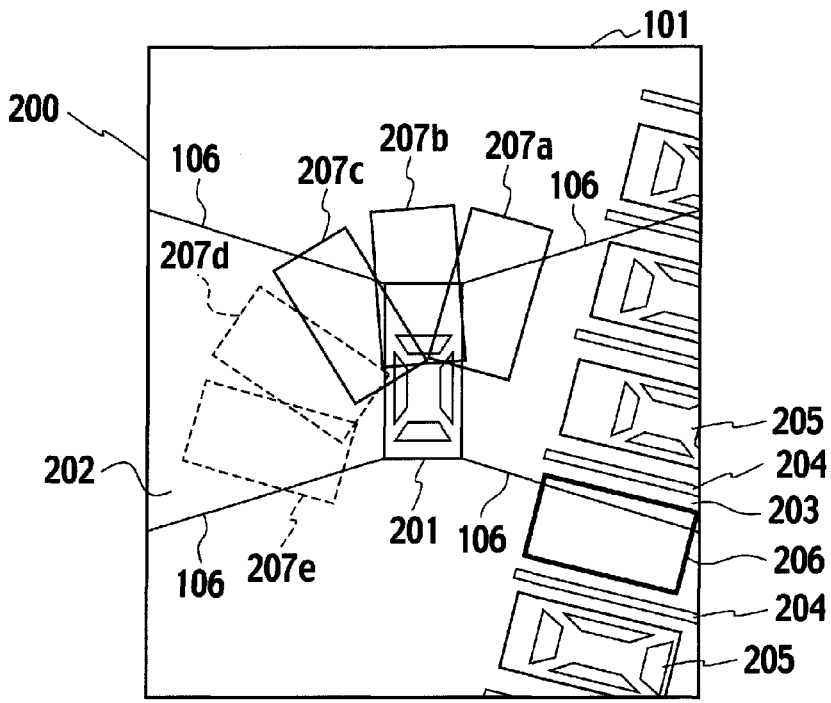
FIG. 6 shows a first example of the air scape image on which the parking target position image and the rearward movement starting position image to which a vehicle is movable are superposed, according to the first embodiment of the present invention.

With a plurality of rearward movement starting position images 207a, 207b, 207c, 207d, 207e thus displayed, when the vehicle moves toward the rearward movement starting position image 207b as shown in FIG. 6, the movement direction and movement amount of the vehicle are calculated with the movement calculator 12 i) based on the vehicle speed signal and ii) based on the tire turning angle information based on the shift position signal and steering angle signal. Hereinabove, the vehicle speed signal and the tire angle information are sensed with the vehicle information sensor 4. Then, as movement amount information, the movement direction and movement amount of the vehicle are supplied to the image generating part 11. In addition, based on the shift position signal and steering angle signal which are sensed by the vehicle information sensor 4, the estimated track calculator 13 calculates the estimated track information which is a physically movable range of the vehicle, and supplies the estimated track information to the image generating part 11.

Based on the movement amount information, the image generating part 11 calculates the own vehicle's present position relative to each of the rearward movement starting positions (207a, 207b, 207c, 207d, 207e). Then, from the own vehicle's present position relative to each of the rearward movement starting positions (207a, 207b, 207c, 207d, 207e) and from the estimated track information supplied by the estimated track calculator 13, the image generating part 11 leaves, on the display image 200, only the rearward movement starting position image(s) 207 that correspond(s) to the rearward movement starting position to which the own vehicle is movable. Meanwhile, from the display image 200, the image generating part 11 deletes the rearward movement starting position image(s) 207 that correspond(s) to the rearward movement starting positions to which the own vehicle is not movable.

When the own vehicle proceeds to the rearward movement starting position image 207b, as shown in FIG. 6, the image generating part 11 leaves the rearward movement starting position images 207a, 207b, 207c on the display image 200, while deleting the rearward movement starting position images 207d, 207e from the display image 200. Hereinabove, the thus deleted rearward movement starting position images 207d, 207e denoted by dots in the display image 200 in FIG. 6 are actually not displayed. As such, the parking assistant 10 can narrow down to the rearward movement starting position image 207 to which the own vehicle is physically movable according to the own vehicle's behavior.

Figure 7:
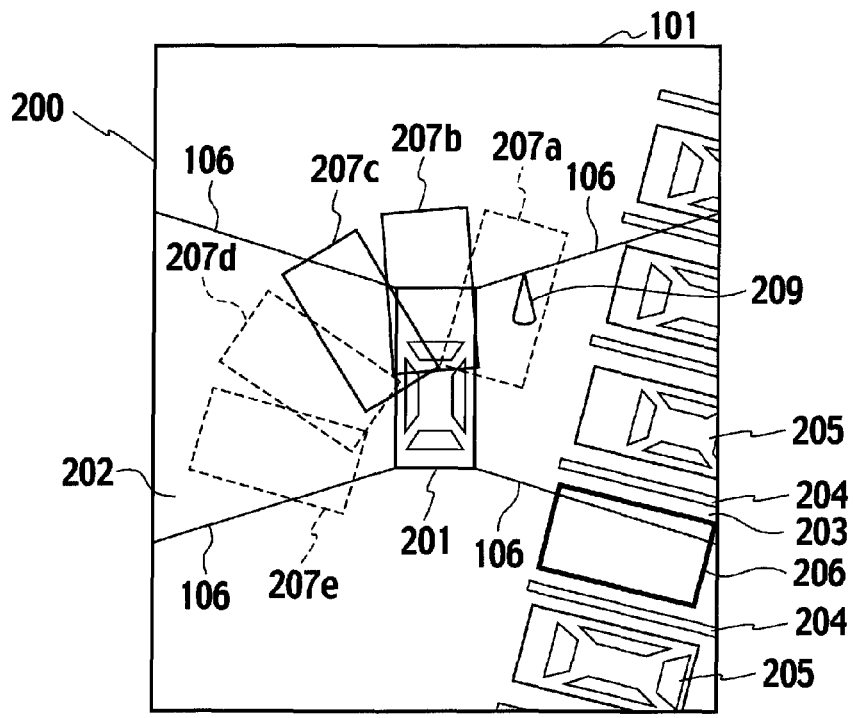
FIG. 7 shows a second example of the air scape image on which the parking target position image and the rearward movement starting position image to which the vehicle is movable are superposed, according to the first embodiment of the present invention.

Moreover, the obstacle (209) present around the own vehicle (201) is sensed with the obstacle sensor 3 serving as an ultrasonic sensor disposed at the front end of the own vehicle. Then, the obstacle (209) is supplied, as an obstacle position information, to the image generating part 11. In this case, comparing a plurality of rearward movement starting positions (207a, 207b, 207c, 207d, 207e) with the obstacle position, the image generating part 11 determines that the own vehicle is not physically movable to the rearward movement starting position when the obstacle is present in the area denoting the rearward movement starting position. Then, as shown in FIG. 7, based on the obstacle position information, the image generating part 11 superposes an obstacle image 209 (as an information image of obstacle) on the display image 200. Then, the image generating part 11 deletes the rearward movement starting position image 207a to which the own vehicle is not physically movable due to the obstacle.

Figure 8:
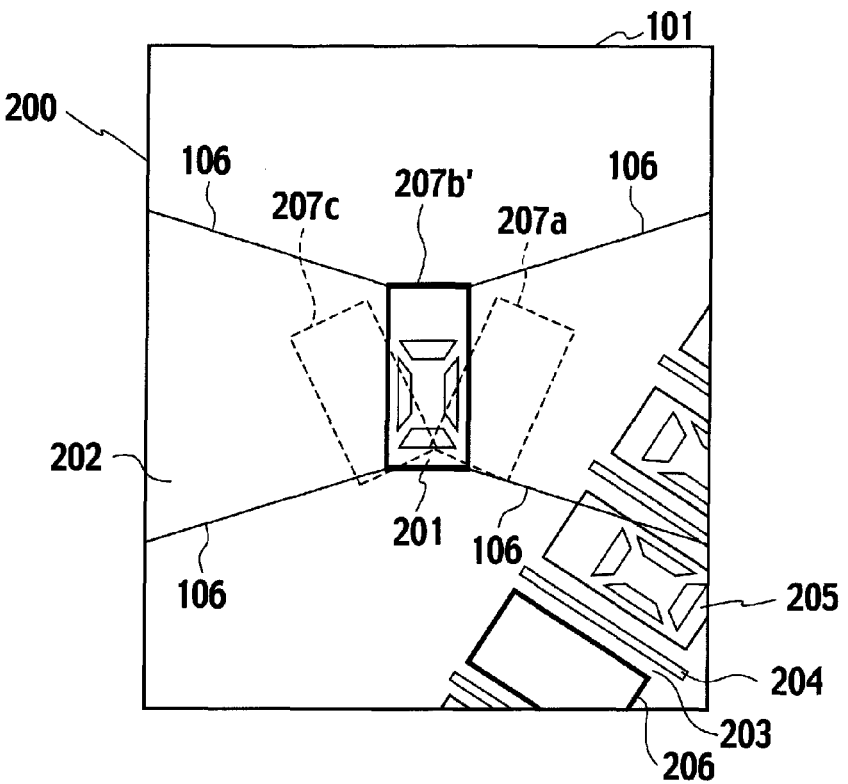
FIG. 8 shows the air scape image having the own vehicle reaching the rearward movement starting position, according to the first embodiment of the present invention.

Then, the own vehicle further moves to reach the rearward movement starting position corresponding to the rearward movement starting position image 207b. Then, based on the movement amount information outputted from the movement calculator 12, the image generating part 11 determines that the own vehicle has reached the area denoting the rearward movement starting position. Then, as shown in FIG. 8, with the rearward movement starting position image 207b (reached by the own vehicle image 201) displayed as an emphasized rearward movement starting position image 207b' (bold), the image generating part 11 deletes the rearward movement starting position images 207a, 207c adjacent to the rearward movement starting position image 207b. Then, it is preferable that the image generating part 11 displays such a language as "You have reached the rearward movement starting position. Change your shift lever to rear position (R)." on the display 5a. Otherwise, notifying the driver of the same language from the speaker 5b is also preferable.

Figure 9:
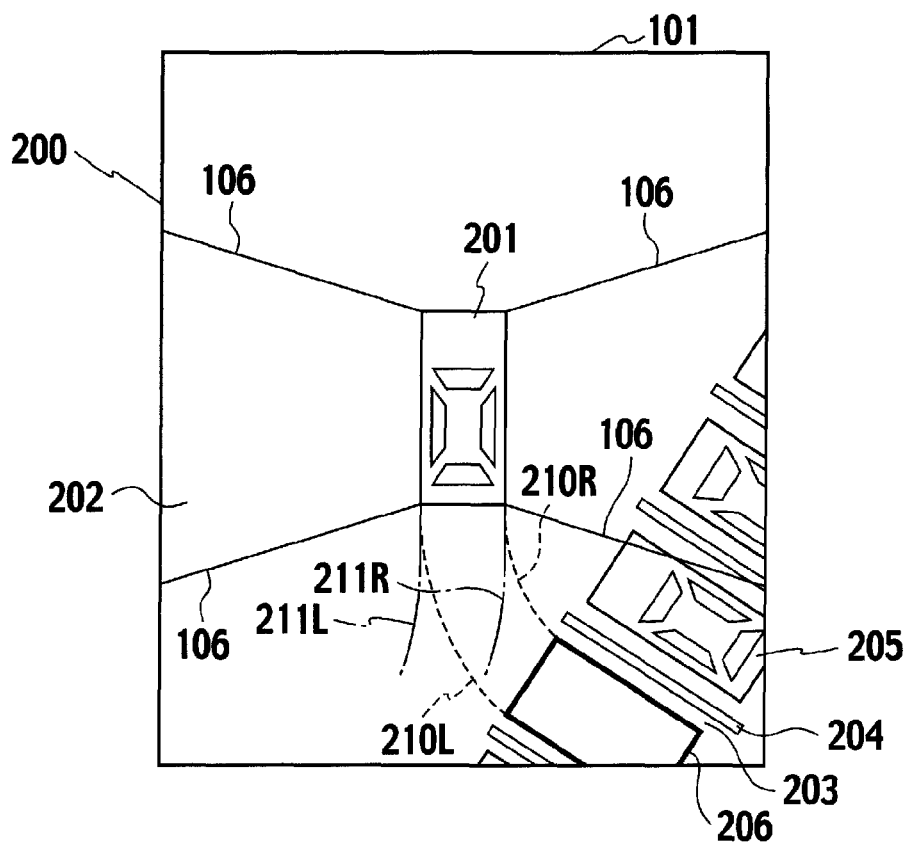
FIG. 9 shows the air scape image on which an ideal track line (210L, 210R) and an estimated track line (211L, 211R) are superposed, according to the first embodiment of the present invention.

Then, as shown in FIG. 9, for guiding the driver to the parking target position when the driver drives the own vehicle rearward from the rearward movement starting position, the image generating part 11 makes a display on the display image 200 according to any of the following pieces of information: 1) information on the rearward movement starting position calculated with the estimated track calculator 13, and 2) ideal track lines 210R, 210L connected from the own vehicle image 201 to the parking target position image 206. Each of the ideal track lines 210R, 210L denotes a track for the own vehicle to reach the parking target position after the own vehicle moves rearward with the tire turning angle (i.e., steering angle) which is made constant in view of the own vehicle's present position relative to the parking target position. On the air scape image, the image generating part 11 superposes the estimated track lines 211R, 211L which are obtained based on the present steering angle signal calculated by the estimated track calculator 13. Then, the image generating part 11 includes the estimated track lines 211R, 211L in the display image 200.

As such, allowing the driver to make such a steering operation as to superpose the estimated track lines 211R, 211L on the ideal track lines 210R, 210L respectively, the parking assistant 10 can lead the own vehicle to the parking target position. In this case, the image generating part 11 displays such a language as "Turn the steering wheel with your vehicle stopped. Then, adjust the green line (the estimated track lines 211R, 211L) to the pink line (the ideal track lines 210R, 210L). Then, drive rearward with the steering wheel fixed." on the display 5*a* or notifies the driver of the same language by means of the speaker 5*b*.

Figure 10:
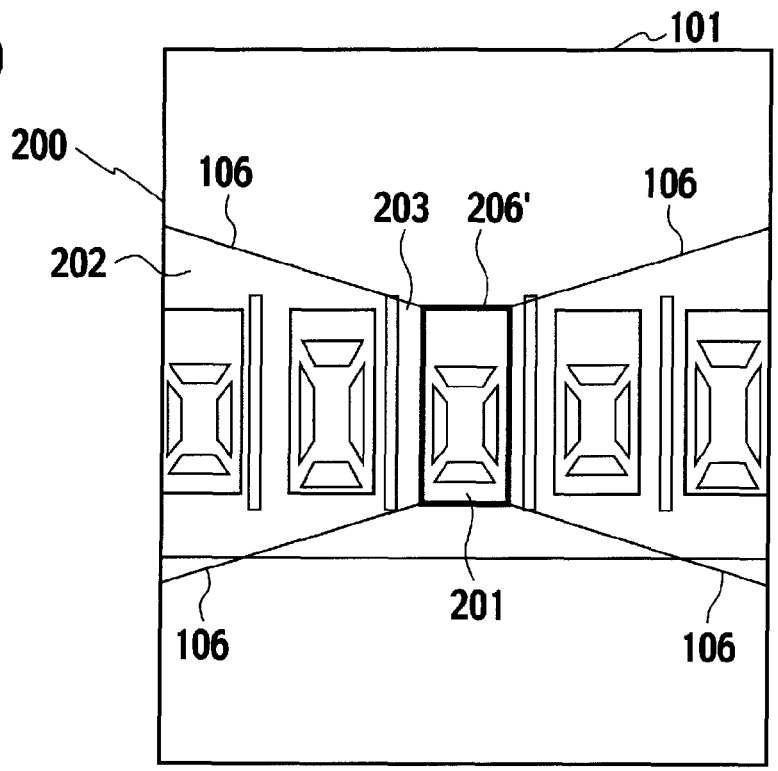
FIG. 10 shows the air scape image having the own vehicle reaching the parking target position, according to the first embodiment of the present invention.

Then, the driver makes such a steering wheel operation as to move the own vehicle image 201 along the ideal track lines 210R, 210L. Then, based on the movement mount information from the movement calculator 12, the image generating part 11 senses that the own vehicle has reached the parking target position. In this case, as shown in FIG. 10, the image generating part 11 displays the display image 200 where an emphasized parking target position image 206' is superposed on the air scape image. Herein, the emphasized parking target position image 206' is an emphasized version of the parking target position image 206 reached by the own vehicle image 201. In addition, the image generating part 11 may display such a language as "Parking completed" on the display 5*a* or notify the same language with a voice from the speaker 5*b*.

<Flowchart>

Figure 11B:
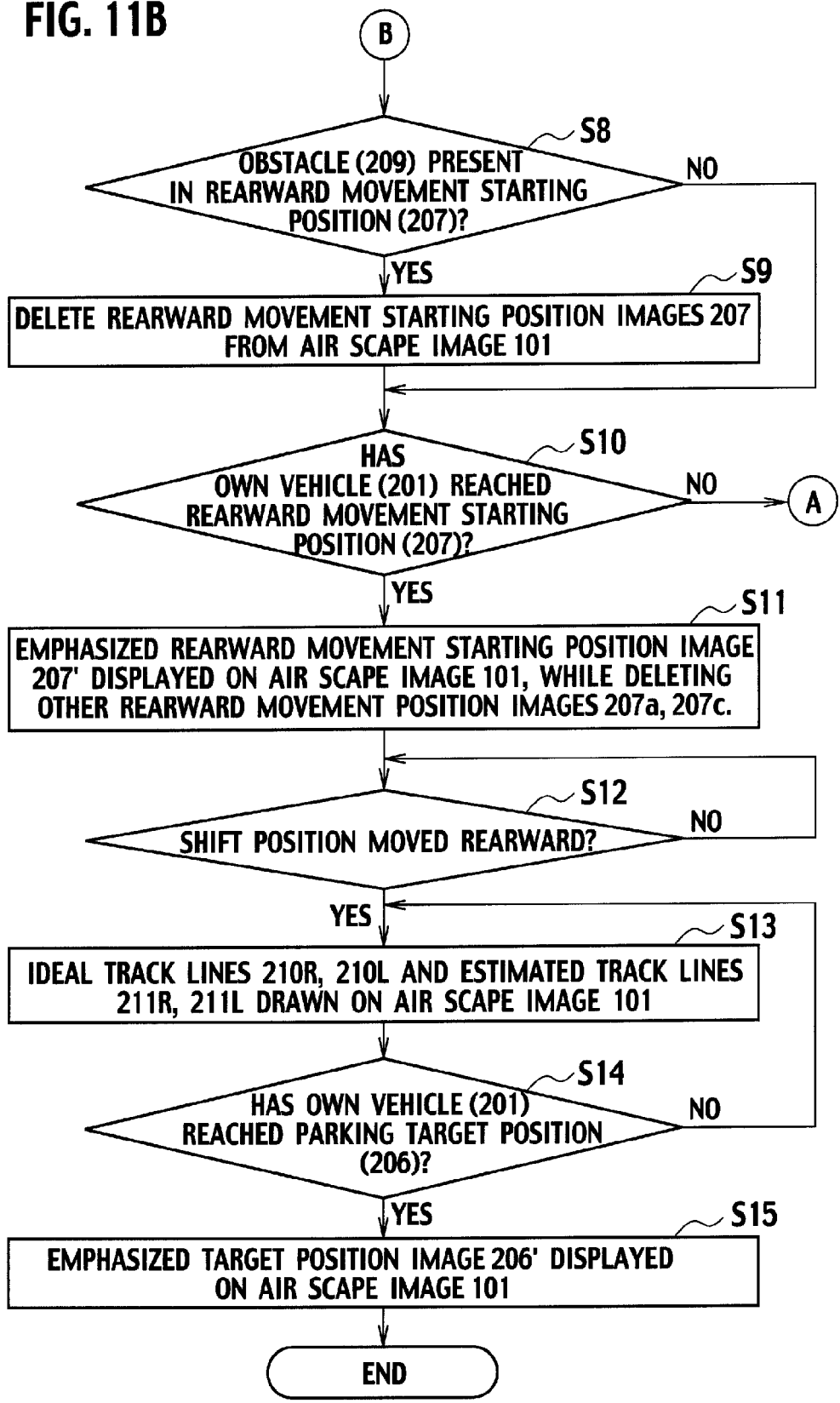
FIG. 11B is a second part of the flowchart showing specific processes for providing the driver with the air scape image on which the parking target position image and the rearward movement starting position image are superposed, in connection with the parking assistant of the present invention.

Then, specific flowcharts of the parking assistant 10 for providing the driver with the above display image 200 is to be set forth referring to FIG. 11A and FIG. 11B.

The parking assisting operation for assisting the driver to park the own vehicle starts with step S1, after the driver operates the operation input part 6 to thereby input, to the controller 1, the operation input signal for starting the parking assistance.

<Step S1>

Figure 4:
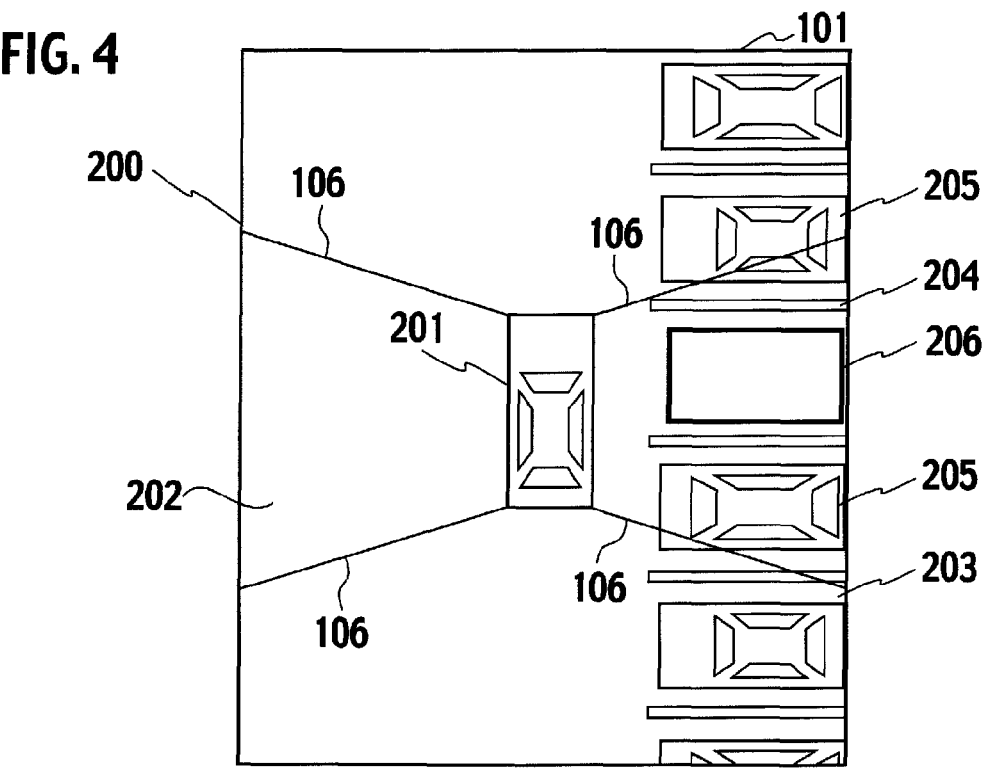
FIG. 4 shows the air scape image where a parking target position image is superposed on a parking area, according to the first embodiment of the present invention.

At step S1, the image generating part 11 sets the parking target position, to thereby display the display image 200 on the display 5*a*. In the display image 200, the parking target position image 206 is superposed on the air scape image 101, as shown in FIG. 4. In this case, the image generating part 11 may set the parking target position based on any of the followings: 1) the driver's input, 2) the obstacle position information of the obstacle sensor 3, and 3) the image generating part 11's recognition of the white lines.

<Step S2>

The, at step S2, the routine displays the parking target position image 206 displayed at step S1. Then, the image generating part 11 determines whether or not the operation input signal for determining the parking target position is inputted from the operation input part 6. When Yes at step S2, then the routine moves to step S3. When No at step S2, then the routine returns to step Si for setting the parking target position again.

<Step S3>

At step S3, based on the parking target position determined by the image generating part 11 at step S2, the image generating part 11 calculates a plurality of rearward movement starting positions, to thereby display the display image 200 where the rearward movement starting position images 207*a*, 207*b*, 207*c*, 207*d*, 207*e* are superposed on the air scape image 101, as shown in FIG. 5.

<Step S4>

At step S4, the image generating part 11 inputs the movement amount information calculated by the movement calculator 12, and obtains the obstacle position information from the obstacle sensor 3, to thereby start sensing the vehicle surroundings.

<Step S5>

At step S5, according to the movement of the vehicle, the routine takes the following operations. According to the movement amount information, the image generating part 11 senses that the vehicle position is changed, to thereby renew relations among the following positions: 1) position of the own vehicle image 201 to be superposed on the air scape image 101, relative to 2) information images such as the parking target position image 206 and the rearward movement starting position image 207.

<Step S6>

At step S6, from the own vehicle's position relative to the rearward movement starting position which positions are sensed at step S5, the image generating part 11 determines whether or not the rearward movement starting position to which the own vehicle is not physically movable is present among a plurality of rearward movement starting positions set at step S3. When Yes at step S6, the routine moves to step S7. Specifically, when the own vehicle image 201 moves toward the rearward movement starting position image 207*b* as shown in FIG. 6, the image generating part 11 determines that the rearward movement starting position to which the own vehicle is physically movable is present. When No at step S6, the routine moves to step S8 by skipping step S7.

In each of FIG. 11A and FIG. 11B, "B" denotes merely a connection between the two drawings.

<Step S7>

At step S7, the image generating part 11 deletes the rearward movement starting position image 207 that corresponds to the rearward movement starting position to which the own vehicle is not physically movable. For example in FIG. 6, the image generating part 11 displays the display image 200, with the rearward movement starting position images 207*d*, 207*e* deleted from the air scape image 101.

<Step S8>

At the subsequent step S8, the image generating part 11 makes the following comparison: 1) the obstacle position information outputted from the obstacle sensor 3, with 2) the rearward movement starting position (among the rearward movement starting positions set at step S3) which was not determined at step S6 to be the rearward movement starting position to which the vehicle is not movable, to thereby determine whether or not the obstacle is present in the rearward movement starting position. When Yes at step S8, i.e., when the obstacle is present in the rearward movement starting position as shown in FIG. 7, the routine moves to step S9. When No at step S8, i.e., when the obstacle is not present in the rearward movement starting position, the routine moves to step S10 by skipping step S9.

<Step S9>

The routine displays the display image 200 where the rearward movement starting position image 207*a* corresponding to the rearward movement starting position having the obstacle is deleted from the air scape image 101.

<Step S10>

At step S10, based on the movement amount information outputted from the movement calculator 12 and based on the rearward movement starting position, the image generating part 11 determines whether or not the own vehicle reaches the rearward movement starting position. When No at step S10, the routine moves to a process A including repetition of step S6 to step S9. When Yes at step S10, the routine moves to step S11.

<Step S11>

When the own vehicle reaches the rearward movement starting position, the image generating part 11 at step S11 changes the rearward movement starting position image 207 (corresponding to the rearward movement starting position reached by the own vehicle) to the emphasized rearward movement starting position image 207*b*' which is an emphasized version of the rearward movement starting position image 207*b*. In addition, the image generating part 11 deletes other rearward movement starting position images 207*a*, 207*c*, as shown in FIG. 8.

<Step S12>

At step S12, referring to the shift position signal, the controller 1 determines whether or not the shift position is moved rearward (R). When Yes at step S12, the routine moves to step S13. When No at step S12, the routine repeats step S12.

<Step S13>

At step S13, based on the information on the ideal track line and estimated track line which are calculated with the estimated track calculator 13, the image generating part 11 displays the display image 200 where the ideal track lines 210R, 210L are superposed on the air scape image 101 and the estimated track lines 211R, 211L are superposed on the air scape image 101, as shown in FIG. 9.

<Step S14>

At the subsequent step S14, based on the movement amount information outputted from the movement calculator 12 relative to the parking target position, the image generating part 11 determines whether or not the own vehicle reaches the parking target position. When No at step S14, the routine continues, at step S13, to display the display image 200 where the ideal track lines 210R, 210L and the estimated track lines 211R, 211L are drawn. When Yes at step S14, the routine moves to step S15.

<Step S15>

At step S15, as shown in FIG. 10, the image generating part 11 changes the parking target position image 206 (corresponding to the parking target position reached by the own vehicle) to the emphasized parking target position image 206' which is an emphasized version of the parking target position image 206. Then, the routine ends the processes.

<Effect>

As set forth above, of the rearward movement starting positions set for the parking target positions, the parking assistant 10 of the present invention narrows down to the rearward movement starting position to which the vehicle is movable, to thereby superpose the rearward movement starting position image 207 on the air scape image. Thereby, according to the vehicle surroundings which fluctuate with the vehicle's movement direction and movement amount, the parking assistant 10 can assist the driver's operation to park the vehicle.

Moreover, when the obstacle is present, the parking assistant 10 displays the display image 200 where the rearward movement starting position image 207 of the rearward movement starting position to which the vehicle is not physically movable due to the presence of the obstacle is deleted. As such, displaying the rearward movement starting position image 207 in a position to which the vehicle is not movable due to the obstacle can be prevented.

Moreover, the parking assistant 10 sets the parking target position according to the driver's operation of selecting the parking target position. As such, the driver can set his/her desired parking target position and set the rearward movement starting position to which the vehicle is movable for reaching the parking target position.

Moreover, the parking assistant 10 can set, as the parking target position, a space which is free of the obstacle including other vehicles. Thereby, the parking assistant 10 can set the parking target position merely by allowing the vehicle to pass near the space free of the obstacle. Then, the parking assistant 10 can set the rearward movement starting position to which the vehicle is movable for reaching the parking target position.

Moreover, the parking assistant 10 sets the parking target position based on the image information between the white lines, thus making it possible to set the parking target position merely by allowing the vehicle to pass near the space where the white lines are drawn. Moreover, the parking assistant 10 sets the rearward movement starting position to which the vehicle is movable for reaching the parking target position.

As such, the parking assistant 10 can provide the driver with the rearward movement starting position which has high degree of freedom.

Moreover, the parking assistant 10 deletes the rearward movement starting position image 207 when the vehicle reaches the rearward movement starting position, and then displays the ideal track lines 210R, 210L superposed on the air scape image and the estimated track lines 211R, 211L superposed on the air scape image. As such, the parking assistant 10 can notify the driver that the driving operation for moving the vehicle to the rearward movement starting position is changed to the driving operation of moving the vehicle to the parking target position.

(Second Embodiment)

Then, the parking assistant 10 according to a second embodiment of the present invention is to be set forth. According to the second embodiment, however, parts or components substantially the same as those according to the first embodiment are denoted by the same numerals and detailed explanations thereof are to be omitted.

As set forth above referring to FIG. 5, the parking assistant 10 according to the first embodiment implements the following operation: displaying the rearward movement starting position image 207 from: 1) the rearward movement starting position which is substantially perpendicular to the parking target position, to: 2) the rearward movement starting position for allowing the own vehicle to reach the parking target position by moving rearward in the tire position neutral point. The rearward movement starting position according to the first embodiment is displayed by the five rearward movement starting position images 207a, 207b, 207c, 207d, 207e which are each rectangular and same in scale as the own vehicle image 201, referring to the example in FIG. 5.

Figure 12:
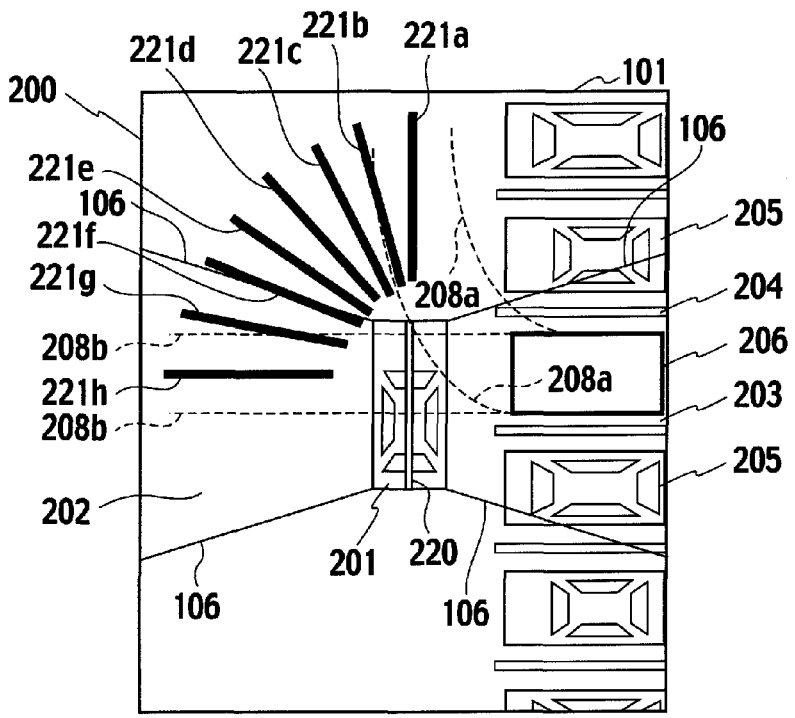
FIG. 12 shows the air scape image on which a plurality of linear rearward movement starting position images, are superposed, according to a second embodiment of the present invention.

Contrary to the above, the parking assistant 10 according to the second embodiment, as shown in FIG. 12, displays the display image 200 where a plurality of linear rearward movement starting position images 221a, 221b, 221c, 221d, 221e, 221f, 221g, 221h are radially superposed on the air scale image. Of the linear rearward movement starting position images 221a, 221b, 221c, 221d, 221e, 221f, 221g, 221h according to the second embodiment, the rearward movement starting position image 221a corresponds to a central position of the rearward movement starting position image 207a according to the first embodiment while the rearward movement starting position image 221h corresponds to a central position of the rearward movement starting position image 207e according to the first embodiment. As such, the parking assistant 10 according to the second embodiment implements the following operation: displaying the rearward movement starting position image 221 (like the rearward movement starting position image 207 according to the first embodiment) from: 1) the rearward movement starting position which is substantially perpendicular to the parking target position, to: 2) the rearward movement starting position for allowing the own vehicle to reach the parking target position by moving rearward in the tire position neutral point.

Moreover, on a central axis of the own vehicle image 201 according to the second embodiment, the parking assistant 10 superposes a linear central axis image 220 on the air scape image. The central axis image 220 is superposed on the own vehicle image 201 in FIG. 14. However, omitting the own vehicle image 201 is allowed.

When the display image 200 showing a state that the rearward movement starting position image 221 and the central axis image 220 are each superposed on the air scape image is displayed on the display 5*a*, the parking assistant 10 makes, for example, the following operations so as to promote the driver's operation of superposing the central axis image 220 on the rearward movement starting position image 221: 1) displaying such a language as "Move your vehicle such that the central axis (the central axis image 220) of the own vehicle is superposed on the orange line (the rearward movement starting position image 221)" on the display 5*a*, or 2) notifying the driver of the same language by means of the speaker 5*b*.

When the own vehicle travels with the rearward movement starting position image 221 displayed, the movement calculator 12 outputs the own vehicle's movement amount information to the image generating part 11. As such, as shown in FIG. 13 for example, the own vehicle image 201 and the central axis image 220 in combination coming closer to the rearward movement starting position image 221 change the display area of the air scape image.

Figure 13:
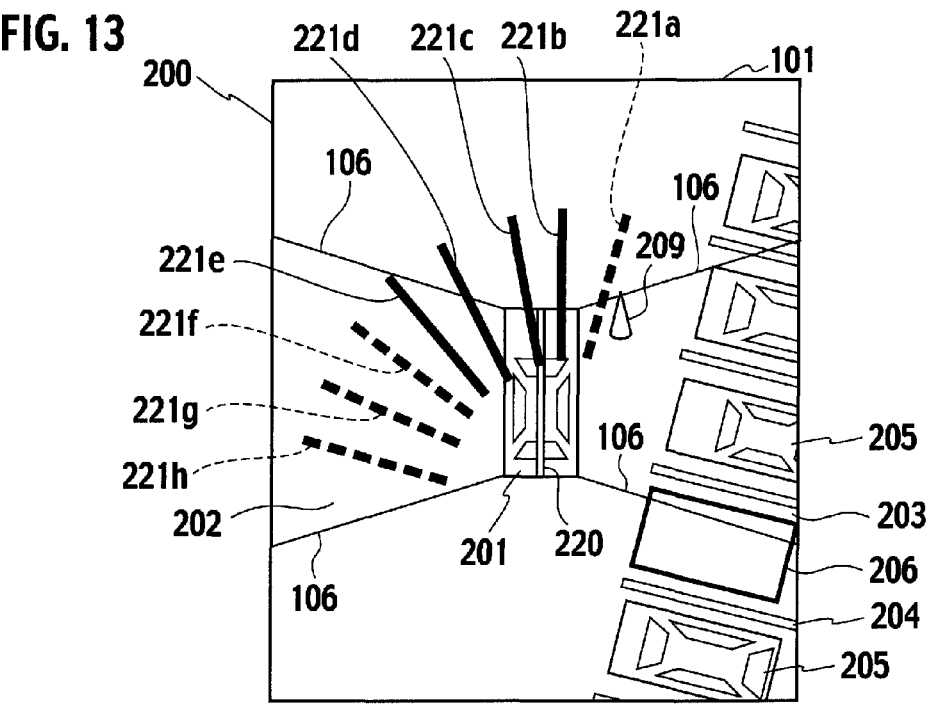
FIG. 13 shows the air scape image on which the parking target position image and the linear rearward movement starting position images to which the vehicle is movable are superposed, according to the second embodiment of the present invention.

Moreover, as shown in FIG. 13, when the vehicle moves to the rearward movement starting position which corresponds to the rearward movement starting position image 221*c*, the image generating part 11 recognizes, from the own vehicle's present position relative to each of the rearward movement starting positions, the rearward movement starting position to which the own vehicle is not movable. Moreover, based on the obstacle position information outputted from the obstacle sensor 3, the image generating part 11 recognizes the rearward movement starting position to which the vehicle is not movable due to the presence of the obstacle. The rearward movement starting position images 221*a*, 221*f*, 221*g*, 221*h* which correspond to the rearward movement starting positions to which the vehicle is not movable are to be deleted as shown in FIG. 13, to thereby display only the rearward movement starting position images 221*b*, 221*c*, 221*d*, 221*e* to which the vehicle is movable.

Figure 14:
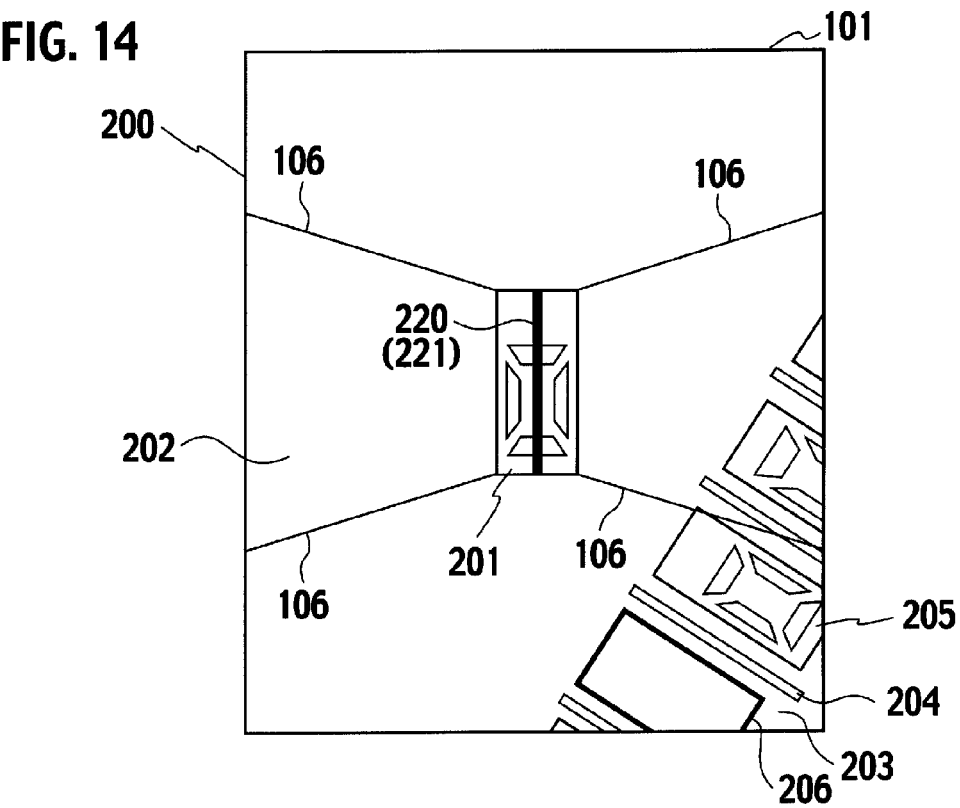
FIG. 14 shows the air scape image having the own vehicle reaching the rearward movement starting position, according to the second embodiment of the present invention.

When the vehicle makes a further movement, as shown in FIG. 14, to such a state that the central axis image 220 is superposed on a certain rearward movement starting position image 221, the rearward movement starting position image 221 other than the certain rearward movement starting position image 221 is to be deleted.

As set forth above, the parking assistant 10 according to the second embodiment displays a plurality of rearward movement starting positions to which the vehicle is movable. As such, according to the vehicle's movable area and a state such as the obstacle, the parking assistant 10 can provide the driver with the rearward movement starting position which has high degree of freedom.

(Third Embodiment)

Then, the parking assistant 10 according to a third embodiment of the present invention is to be set forth. According to the second embodiment, however, parts or components substantially the same as those according to the first and second embodiments are denoted by the same numerals and detailed explanations thereof are to be omitted.

Figure 15:
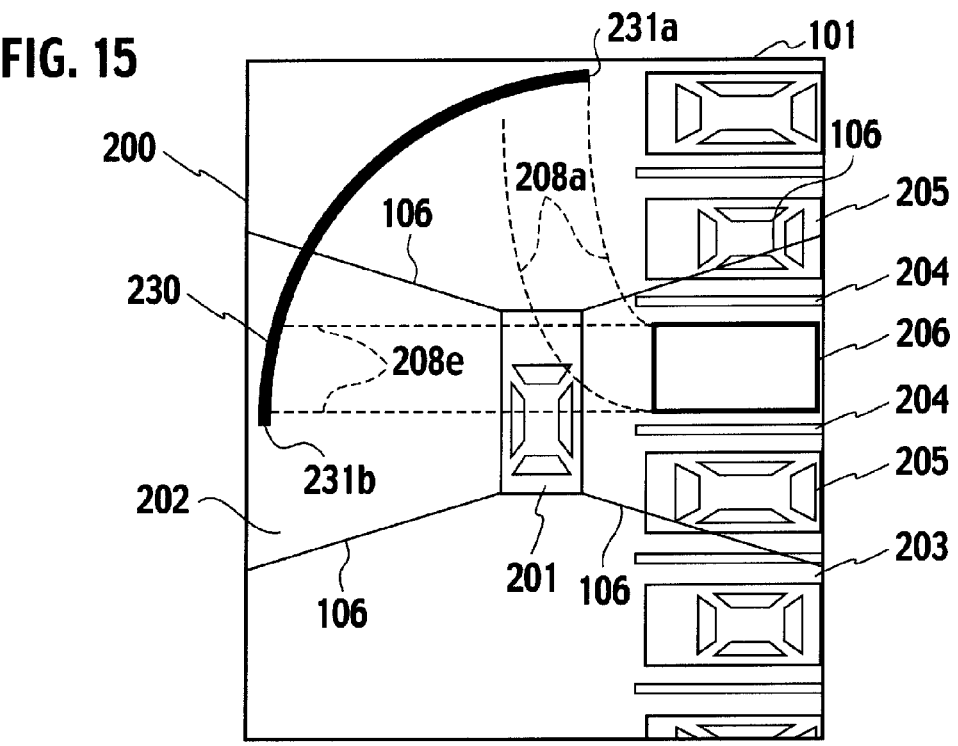
FIG. 15 shows the air scape image on which a single rearward movement starting position image is superposed, according to a third embodiment of the present invention.

The parking assistant 10 according to the third embodiment displays a rearward movement starting position image 230 displaying a single area, as shown in FIG. 15. The rearward movement starting position image 230 displays a rearward movement starting position by means of an arc having a certain width. An end part 231*a* of the rearward movement starting position image 230 denotes an end position of the rearward movement starting position image 207*a* shown in FIG. 5 according to the first embodiment, while an end part 231*b* of the rearward movement starting position image 230 denotes an end position of the rearward movement starting position image 207*e* shown in FIG. 5 according to the first embodiment. As such, the parking assistant 10 according to the third embodiment implements the following operation: displaying the area (like the rearward movement starting position image 207 according to the first embodiment) from: 1) the rearward movement starting position which is substantially perpendicular to the parking target position, to: 2) the rearward movement starting position for allowing the own vehicle to reach the parking target position by moving rearward in the tire position neutral point.

When the display image 200 showing a state that the rearward movement starting position image 230 is superposed on the air scape image is displayed on the display 5*a*, the parking assistant 10 makes, for example, the following operations so as to promote the driver's operation of superposing the rearward movement starting position image 221's head end on the rearward movement starting position image 230: 1) displaying such a language as "Move your vehicle such that the head end of your vehicle is disposed in the orange area (the rearward movement starting position image 230)," or 2) notifying the driver of the same language by means of the speaker 5*b*.

Figure 16:
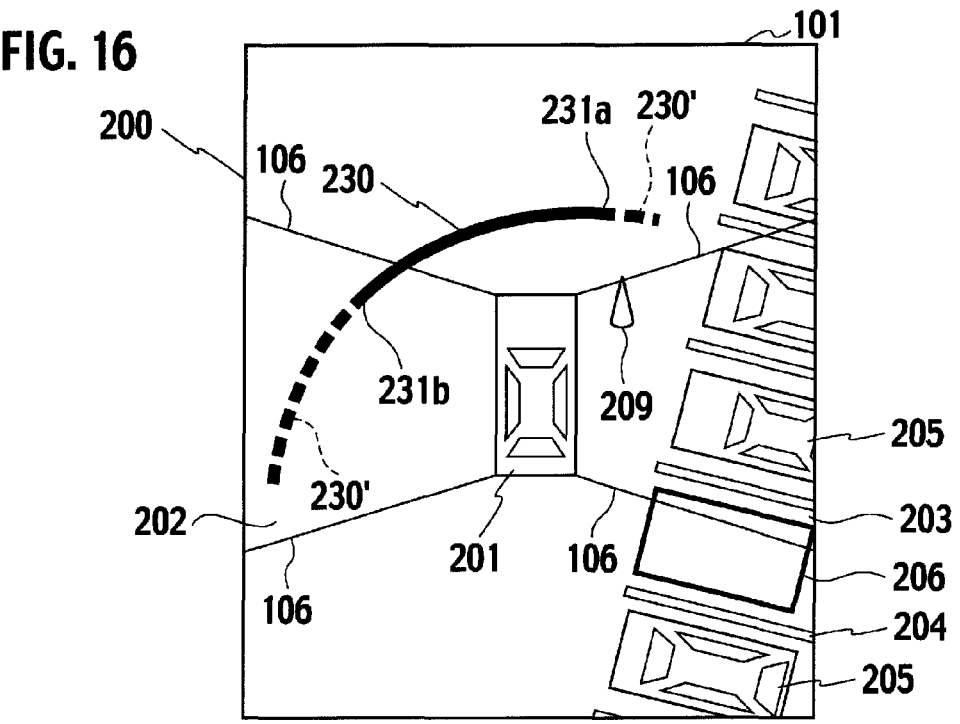
FIG. 16 shows the air scape image on which the parking target position image and the rearward movement starting position image which has such a scale that the vehicle is movable are superposed, according to the third embodiment of the present invention.

When the own vehicle travels with the rearward movement starting position image 230 displayed, the movement calculator 12 outputs the own vehicle's movement amount information to the image generating part 11. As such, as shown in FIG. 16 for example, when the own vehicle image 201 comes closer to the rearward movement starting position image 230, the image generating part 11 recognizes, from the own vehicle's present position relative to the rearward movement starting position, the rearward movement starting position to which the own vehicle is not movable. Moreover, based on the obstacle position information outputted from the obstacle sensor 3, the image generating part 11 recognizes the rearward movement starting position to which the vehicle is not movable due to the presence of the obstacle. A rearward movement starting position image 230' which corresponds to the rearward movement starting position to which the vehicle is not movable is to be deleted as shown in FIG. 16 by an amount equivalent to the vehicle's immovable area, to thereby display only the rearward movement starting position image 230 to which the vehicle is movable.

Figure 17:
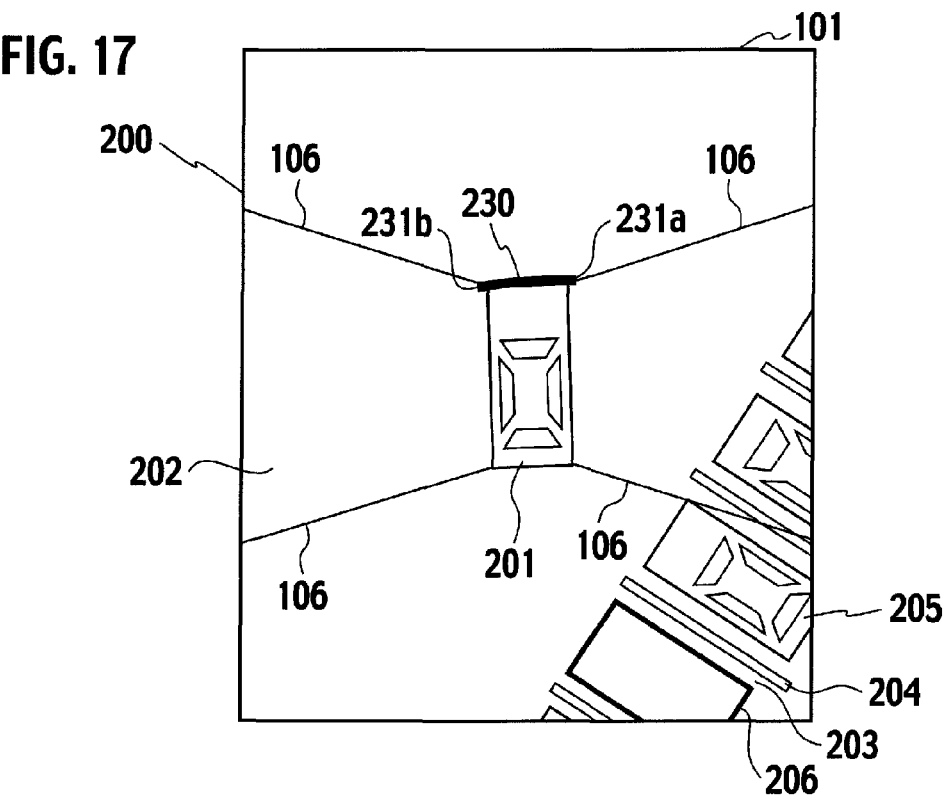
FIG. 17 shows the air scape image having the own vehicle reaching the rearward movement starting position, according to the third embodiment of the present invention.

When the vehicle makes a further movement, as shown in FIG. 17, to such a state that the own vehicle image 201 is superposed on the rearward movement starting position image 230 having a certain area, the rearward movement starting position image 230 other than the rearward movement starting position image 230 that has the certain area is to be deleted.

As set forth above, the parking assistant 10 according to the third embodiment displays, as an area, the rearward movement starting position to which the vehicle is movable. As such, according to the vehicle's movable area and a state such as the obstacle, the parking assistant 10 can provide the driver with the rearward movement starting position which has high degree of freedom.

Although the present invention has been described above by reference to certain embodiments, the present invention is not limited to the embodiments described above. Modifications and variations of the embodiment(s) described above will occur to those skilled in the art, in light of the above teachings and within a range covered by the technical concept of the present invention.

For example, in FIG. 6 to FIG. 8 of the first embodiment, the rearward movement starting position images are decreased according to the movement of the own vehicle, in other words, the rearward movement starting position(s) to which the own vehicle is not movable is(are) deleted. The present invention is, however, not limited to this. Otherwise, the display of the rearward movement starting position(s) to which the own vehicle is not movable (for short, "not movable" rearward movement starting position) may be left by differentiating the "not movable" rearward movement starting position(s) from the rearward movement starting position(s) to which the own vehicle is movable (for short, "movable" rearward movement starting position). In this case, the "movable" rearward movement starting position(s) may be denoted by an actual line while the "not movable" rearward movement starting position(s) may be denoted by a dotted line, or the former maybe denoted by an orange line while the latter may be denoted by a red line. The above denotations are likewise applicable to FIG. 13 of the second embodiment and FIG. 16 of the third embodiment.

Industrial Applicability

The present invention makes the following display: Of the rearward movement starting positions, only the information image that denotes the rearward movement starting position to which the vehicle is movable is superposed on the vehicle surroundings image. As such, according to the vehicle surroundings changeable with the vehicle's movement direction and movement amount, the present invention can assist the driver to park the vehicle.

This application is based on a prior Japanese Patent Application No. P2007-257986 (filed on Oct. 1, 2007 in Japan). The entire contents of the Japanese Patent Application No. P2007-257986 from which priority is claimed are incorporated herein by reference, in order to take some protection against translation errors or omitted portions.

The scope of the present invention is defined with reference to the following claims.

The invention claimed is:

1. A parking assistant comprising:
a shooting part for shooting vehicle surroundings;
a parking target position setter for setting a parking target position in a vehicle surroundings image shot by the shooting part;
a rearward movement starting position candidate calculator for calculating candidates for a rearward movement starting position based on:
the parking target position set by the parking target position setter, and a movable area of a vehicle,
the rearward movement starting position denoting a position for stopping the vehicle and thereby starting a rearward movement of the vehicle, so as to park the vehicle in the parking target position;
a movement calculator for sensing a movement direction of the vehicle and a movement amount of the vehicle;
an image generator for superposing an information image on the vehicle surroundings image based on the movement direction and the movement amount which are sensed with the movement calculator,
wherein
the information image denotes the candidates for the rearward movement starting position for allowing the vehicle to be parked in the parking target position, and during a movement of the vehicle toward a certain candidate selected from the candidates for the rearward movement starting position, according to the sensed movement direction and the sensed movement amount of the vehicle, the image generator generates, with different displays, a plurality of sub-positions of the candidates for the rearward movement starting position; the plurality of sub-positions including
a first sub-position which allows the vehicle to move to the parking target position, and
a second sub-position which fails to allow the vehicle to be parked in the parking target position;
and
further comprising an obstacle sensor for sensing a position of an obstacle present in the vehicle surroundings, wherein based on the position of the obstacle sensed with the obstacle sensor, the image generator deletes from the information image a candidate which is selected from the candidates for the rearward movement starting position calculated with the rearward movement starting position candidate calculator and to which the vehicle is not movable due to the obstacle.

2. The parking assistant according to claim 1, wherein the different displays include: a first display of the first sub-position which allows the vehicle to be parked in the parking target position, and a second display of the second sub-position which fails to allow the vehicle to he parked in the parking target position.

3. The parking assistant according to claim 2, wherein the first sub-position by the first display is denoted by an actual line, and the second sub-position by the second display is denoted by a dotted line.

4. The parking assistant according to claim 2, wherein the first sub-position by the first display is denoted in orange, and the second sub-position by the second display is denoted in red.

5. The parking assistant according to claim 1, wherein the image generator implements the following operations: making a coordinates conversion of the vehicle surroundings image shot by the shooting part, generating thereby an air scape image, and superposing the information image on the air scape image:
the information image denoting the candidates for the rearward movement starting position as an area.

6. The parking assistant according to claim 1, wherein the image generator deletes from the information image a candidate which is selected from the candidates for the rearward movement starting position calculated with the rearward movement starting position candidate calculator.

7. The parking assistant according to claim 1, wherein the parking target position setter includes an operation input part to which the driver inputs a position in the vehicle surroundings image, and based on the position in vehicle surroundings image, the parking target position setter sets the parking target position.

8. The parking assistant according to claim 1, wherein the parking target position setter sets, as the parking target position, an area where the obstacle is not sensed with the obstacle sensor.

9. The parking assistant according to claim 1, further comprising an image recognizer for recognizing a white line included in the vehicle surroundings image shot by the shooting part, wherein based on a piece of image information between the white lines recognized by the image recognizer, the parking target position setter sets the parking target position.

10. The parking assistant according to claim 1, wherein in the following state, the image generator deletes the information image candidates other than the certain candidate for the rearward movement starting position:
based on the movement direction of the vehicle and the movement amount of the vehicle which are sensed with the movement calculator, the vehicle is determined to reach the certain candidate for the rearward movement starting position, and on the vehicle surroundings image, the image generator superposes an ideal track line of the vehicle and an estimated track line of the vehicle, the ideal track line extending:

from the certain candidate for the rearward movement starting position reached the vehicle, to the parking target position, and the estimated track line being calculated based on a steering angle of the vehicle.

\* \* \* \* \*